(12) United States Patent
Wang et al.

(10) Patent No.: US 11,853,250 B2
(45) Date of Patent: Dec. 26, 2023

(54) INTERCONNECT INTERFACE

(71) Applicant: Shanghai Zhaoxin Semiconductor Co., Ltd., Shanghai (CN)

(72) Inventors: Weilin Wang, Beijing (CN); Fan Yang, Beijing (CN); Shuai Zhang, Beijing (CN); Chunhui Zheng, Beijing (CN); Peng Shen, Beijing (CN)

(73) Assignee: SHANGHAI ZHAOXIN SEMICONDUCTOR CO., LTD., Shanghai (CN)

(*) Notice: Subject to any disclaimer, the term of this patent is extended or adjusted under 35 U.S.C. 154(b) by 76 days.

(21) Appl. No.: 17/506,124

(22) Filed: Oct. 20, 2021

(65) Prior Publication Data
US 2023/0095940 A1  Mar. 30, 2023

(30) Foreign Application Priority Data

Sep. 28, 2021 (CN) .......................... 202111141627.5
Sep. 28, 2021 (CN) .......................... 202111142578.7
(Continued)

(51) Int. Cl.
*G06F 13/42* (2006.01)
*H04L 45/02* (2022.01)
(Continued)

(52) U.S. Cl.
CPC ........ *G06F 13/4265* (2013.01); *G06F 1/3234* (2013.01); *G06F 9/4418* (2013.01);
(Continued)

(58) Field of Classification Search
None
See application file for complete search history.

(56) References Cited

U.S. PATENT DOCUMENTS 9,929,928 B1 * 3/2018 Dekoos ................... H04L 43/08
10,339,059 B1   7/2019 Mattina
(Continued)

OTHER PUBLICATIONS

Notice of Allowance dated Oct. 26, 2022, issued in U.S. Appl. No. 17/511,800.
(Continued)

*Primary Examiner* — Henry Tsai
*Assistant Examiner* — Dean Phan
(74) *Attorney, Agent, or Firm* — McClure, Qualey & Rodack, LLP

(57) ABSTRACT

An interconnect interface is applied between sockets or between dies. The interconnect interface includes a first transmitter (TX), a first receiver (RX), and an electrical physical layer (EPHY) coupled between the first TX and the first RX. The data provided by a first device is transmitted from the first TX to the EPHY and then received by the first RX to be retrieved by a second device. The first TX includes an arbiter for arbitrating between a plurality of channels of the first device to obtain data from the first device. The first TX includes a packet generator, which packs the data obtained from the first device into a packet to be transmitted through the EPHY. The first TX further includes a first buffer that backs up the data obtained from the first device for retransmission.

19 Claims, 21 Drawing Sheets

(30) Foreign Application Priority Data

Sep. 28, 2021 (CN) .......................... 202111142579.1
Sep. 28, 2021 (CN) .......................... 202111142604.6

(51) Int. Cl.

| | | |
|---|---|---|
| *H04L 45/00* | (2022.01) | |
| *H04L 45/745* | (2022.01) | |
| *H04L 45/42* | (2022.01) | |
| *G06F 15/78* | (2006.01) | |
| *G06F 13/40* | (2006.01) | |
| *H04L 1/00* | (2006.01) | |
| *H04L 69/324* | (2022.01) | |
| *G06F 1/3234* | (2019.01) | |
| *G06F 9/4401* | (2018.01) | |
| *G06F 9/48* | (2006.01) | |
| *G06F 13/16* | (2006.01) | |

(52) U.S. Cl.
CPC ........ *G06F 9/4812* (2013.01); *G06F 13/1668* (2013.01); *G06F 13/4027* (2013.01); *G06F 13/4068* (2013.01); *G06F 15/7807* (2013.01); *G06F 15/7825* (2013.01); *H04L 1/004* (2013.01); *H04L 45/02* (2013.01); *H04L 45/22* (2013.01); *H04L 45/42* (2013.01); *H04L 45/745* (2013.01); *H04L 69/324* (2013.01); *G06F 13/4208* (2013.01); *G06F 13/4282* (2013.01)

(56) References Cited

U.S. PATENT DOCUMENTS

| | | | | |
|---|---|---|---|---|
| 10,505,851 | B1* | 12/2019 | Matthews | ............. H04L 47/215 |
| 11,526,460 | B1 | 12/2022 | Wang et al. | |
| 11,569,939 | B1 | 1/2023 | Krishnamurthy et al. | |
| 2003/0225737 | A1* | 12/2003 | Mathews | ............ H04L 12/5601 |
| 2008/0209298 | A1* | 8/2008 | Chae | ..................... H04L 1/1812 |
| | | | | 714/748 |
| 2010/0002589 | A1 | 1/2010 | Ciordas et al. | |
| 2010/0191894 | A1 | 7/2010 | Bartley et al. | |
| 2012/0290864 | A1* | 11/2012 | Seroff | ........................ G06F 1/26 |
| | | | | 713/340 |
| 2013/0057338 | A1 | 3/2013 | Venkatraman | |
| 2014/0177473 | A1 | 6/2014 | Kumar et al. | |
| 2015/0263949 | A1 | 9/2015 | Roch et al. | |
| 2016/0239461 | A1 | 8/2016 | Kavipurapu | |
| 2017/0060212 | A1 | 3/2017 | Kaushal et al. | |
| 2017/0171618 | A1* | 6/2017 | Fryer | ................. H04N 21/6125 |
| 2017/0185449 | A1 | 6/2017 | Zhang et al. | |
| 2018/0189222 | A1* | 7/2018 | Srivastava | ............ G06F 13/287 |
| 2018/0276139 | A1 | 9/2018 | Wysoczanski et al. | |
| 2019/0044916 | A1* | 2/2019 | Jones | .................. H04L 63/0471 |
| 2020/0153757 | A1 | 5/2020 | Bharadwaj et al. | |
| 2020/0326771 | A1 | 10/2020 | Wu | |
| 2020/0393891 | A1 | 12/2020 | Baggett | |
| 2021/0306257 | A1 | 9/2021 | Dutta | |
| 2021/0326277 | A1 | 10/2021 | Kee | |
| 2022/0019552 | A1 | 1/2022 | Wilkinson et al. | |
| 2022/0045948 | A1 | 2/2022 | Shen et al. | |
| 2022/0058151 | A1 | 2/2022 | Woo | |

OTHER PUBLICATIONS

Saponara, S., et al.; "Configurable network-on-chip router macrocells;" Microprocessors and Microsystems 45; 2016; pp. 141-150.

Wang, N., et al.; "Traffic Allocation: An Efficient Adaptive Network-on-Chip Routing Algorithm Design;" 2nd IEEE International Conference on Computer and Communications; 2016; pp. 2015-2019.

Non-Final Office Action issued in U.S. Appl. No. 17/506,144, filed Oct. 20, 2021, dated Nov. 25, 2022.

Non-Final Office Action dated Mar. 16, 2023, issued in U.S. Appl. No. 17/523,049.

Non-Final Office Action dated Oct. 5, 2023, issued in U.S. Appl. No. 17/523,049.

* cited by examiner

INTERCONNECT INTERFACE

CROSS REFERENCE TO RELATED APPLICATIONS

This application claims priority of China Patent Application No. 202111142604.6 filed on Sep. 28, 2021, China Patent Application No. 202111142578.7 filed on Sep. 28, 2021, China Patent Application No. 202111141627.5 filed on Sep. 28, 2021, and China Patent Application No. 202111142579.1 filed on Sep. 28, 2021, the entirety of which are incorporated by reference herein.

BACKGROUND OF THE INVENTION

Field of the Invention

The present invention relates to interconnect interfaces and, in particular, to an interconnect interface between sockets (a socket-to-socket interconnect interface), and an interconnect interface between dies on the same socket (a die-to-die interconnect interface).

Description of the Related Art

Traditional point-to-point communication is realized by a high-speed serial bus, PCIE.

However, the high-speed serial bus (PCIE) will complicate the pipeline design, prolong transmission delay, increase the hardware cost, and limit the effective bandwidth, etc. . . . .

The technical field needs an interconnect interface with low latency, high reliability, and effective bandwidth utilization.

BRIEF SUMMARY OF THE INVENTION

The present invention discloses high-performance interconnect interfaces, such as a socket-to-socket interconnect interface between sockets, or a die-to-die interconnect interface between dies on the same socket.

An interconnect interface (ZPI/ZDI) in accordance with an exemplary embodiment of the present invention includes a first transmitter (TX0) and a first receiver (RX0), and an electrical physical layer (EPHY) coupled between the first transmitter (TX0) and the first receiver (RX0). Data obtained from a first device (socket0/Die0) is transmitted by the first transmitter, transferred through the electrical physical layer, received by the first receiver. The first transmitter includes an arbiter (TXARB) for arbitrating between a plurality of channels (CH1~CHN) of the first device to obtain the data from the first device. The first transmitter includes a packet generator (PacketGen), which packs the data obtained from the first device into packets (such as flits) to be transferred through the electrical physical layer. The first transmitter further includes a first buffer (RetryBuf) that backs up the data obtained from the first device for retransmission.

In an exemplary embodiment, the first transmitter further includes a dummy packet generator (FlitGen), which generates packets carrying dummy contents to be transferred through the electrical physical layer when the packet generator is idle without generating any packets. The first transmitter further includes a parallel-to-serial converter (PtoS), by which the packets are converted from a parallel form into a serial form to be transferred through the electrical physical layer. The first receiver includes a serial-to-parallel converter (StoP), which performs serial-to-parallel conversion on the packets received from the electrical physical layer. The first receiver further includes a decoder (FlitDec), which decodes the received packets and outputs decoded data, wherein the decoded data comprise the data obtained from the first device. The first receiver further includes a verification logic module, for verification of the decoded data. When the verification fails, the verification logic module discards the decoded data, and informs the second device to issue a retransmission request to the first device. The first receiver further includes an analysis module (RXanls), which analyzes the decoded data that has passed verification and distributes them, according to analysis, to a plurality of channels (CH1~CHN) of the second device.

In an exemplary embodiment, the interconnect interface further includes a second transmitter (TX1) and a second receiver (RX1) coupled at two ends of the electrical physical layer. The second transmitter is coupled to the second device and the second receiver is coupled to the first device, and the interconnect interface form a full-duplex structure.

In an exemplary embodiment, the first transmitter further includes a retransmission controller (RetryCon). When the verification logic module of the first receiver fails the verification of the decoded data, the second device issues the retransmission request to be transferred to the first device through the second transmitter, the electrical physical layer, and the second receiver. According to the retransmission request, the first device operates the retransmission controller in the first transmitter to obtain backup data from the first buffer for retransmission.

In an exemplary embodiment, the first transmitter further includes a state machine (LTSSM), which stops the arbiter and reduces the transmission rate of the electrical physical layer when being switched to a low-speed state. The first transmitter further includes a second buffer. When the state machine is in the low-speed state, packets that the electrical physical layer has not yet transferred are buffered in the second buffer. In an exemplary embodiment, the first receiver further includes a third buffer, buffering data received from the electrical physical layer to wait for verification and analysis. When the third buffer is full, the second device issues a slow-down request to be transferred to the first device through the second transmitter, the electrical physical layer, and the second receiver. According to the slow-down request, the first device switches the state machine to the low-speed state. In an exemplary embodiment, the state machine is switched to the low-speed state by the first device in response to a low power consumption setting.

In an exemplary embodiment, each packet transmitted between the first device and the second device through the interconnect interface is in a format that includes such information as unit code (FlitCode), packet contents, cyclic redundancy checking code (CRC), and forward error correction code (FEC). Data provided by the first device or the second device for transmission is packed as packet contents. The unit code shows the attribution of the packet contents. The cyclic redundancy checking code and the forward error correction code allow the receiver to verify the packet contents.

In an exemplary embodiment, the first transmitter and the first receiver are pipelined hardware.

In an exemplary embodiment, the first device and the second device are a first socket and a second socket, respectively. Each packet transmitted between the first socket and the second socket through the interconnect interface is of a non-fixed length, $2^N$ bits, and N is a natural number. The first transmitter further includes a data compressor (DataComp) coupled between the arbiter and the packet generator, to compress data to form the packets, each of which has a non-fixed length. To process each packet of non-fixed length, the first receiver further includes a data rearrangement module (DataRea), which rearranges data passing verification and supplies rearranged data to the analysis module.

In an exemplary embodiment, the first device and the second device are a first die and a second die, respectively. Each packet transmitted between the first die and the second die through the interconnect interface is of a fixed length.

In an exemplary embodiment, a handshaking technology is adopted. By handshaking between the first device and the first transmitter, the first transmitter obtains data from the first device, and transmits the obtained data to the first receiver through the electrical physical layer. By handshaking between the first receiver and the second device, data that the first receiver receives from the electrical physical layer is transferred to the second device.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The present invention discloses high-performance interconnect interfaces, such as a socket-to-socket interconnect interface between sockets, or a die-to-die interconnect interface between dies on the same socket.

First, a socket-to-socket interconnect interface between the different sockets is introduced, which is named a ZPI interconnect interface in the following discussion.

Figure 1:
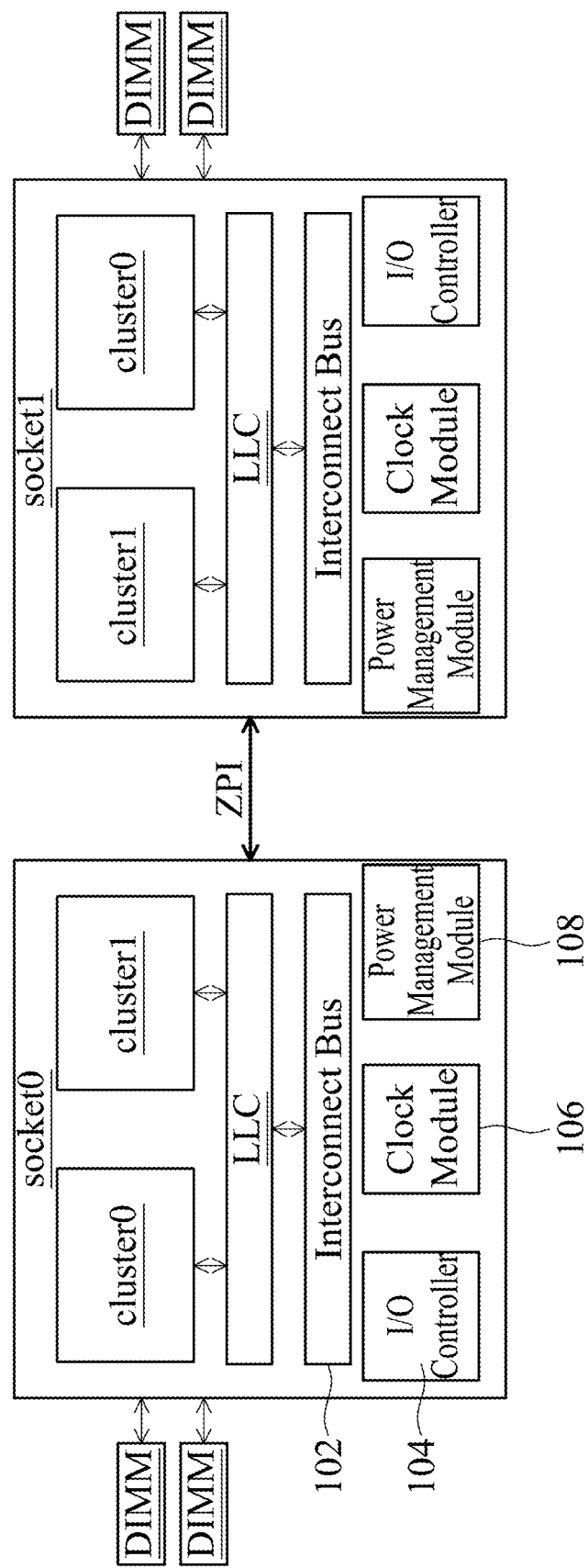
FIG. 1 depicts a socket-to-socket interconnect interface ZPI in accordance with an exemplary embodiment of the present invention.

FIG. 1 depicts a socket-to-socket interconnect interface ZPI in accordance with an exemplary embodiment of the present invention. Two sockets socket0 and socket1 are connected by a socket-to-socket interconnect interface ZPI (also labeled ZPI). In the example, each socket provides two clusters, labeled cluster0 and cluster1. There may have other numbers of clusters on one socket. Each cluster includes several central processing unit (CPU) cores. Each socket may have a last level cache LLC, an interconnect bus 102, and various components (such as an input/output controller 104, a clock module 106, a power management module 108, etc.). Each socket can be connected to dual in-line memory modules DIMM.

As connected through the socket-to-socket interconnect interface ZPI, the sockets socket0 and socket1 form a system. The CPU cores and the input/output resources of all clusters on the different sockets socket0 and socket1 can be scheduled together, and the memories owned by the different sockets socket0 and socket1 can be shared in the system.

In an exemplary embodiment, through the socket-to-socket interconnect interface ZPI, the packets (also known as flits in the present invention) cached into the different sockets are in a uniform format. In this manner, any CPU core or I/O device in a system formed by the connected sockets can access any memory in the system.

Figure 2A:
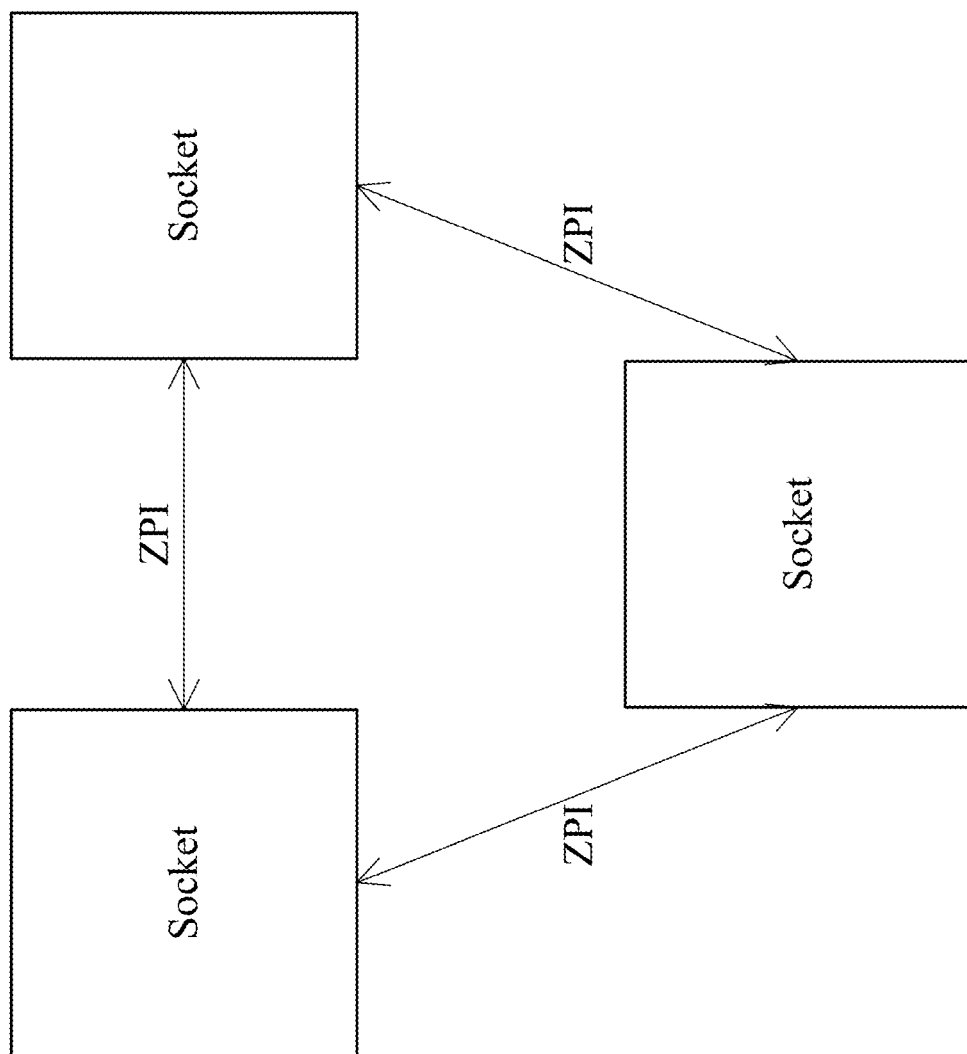
FIGS. 2A to 2C illustrate other planar interconnection embodiments between sockets connected by the socket-to-socket interconnect interface ZPI.
Figure 2B:
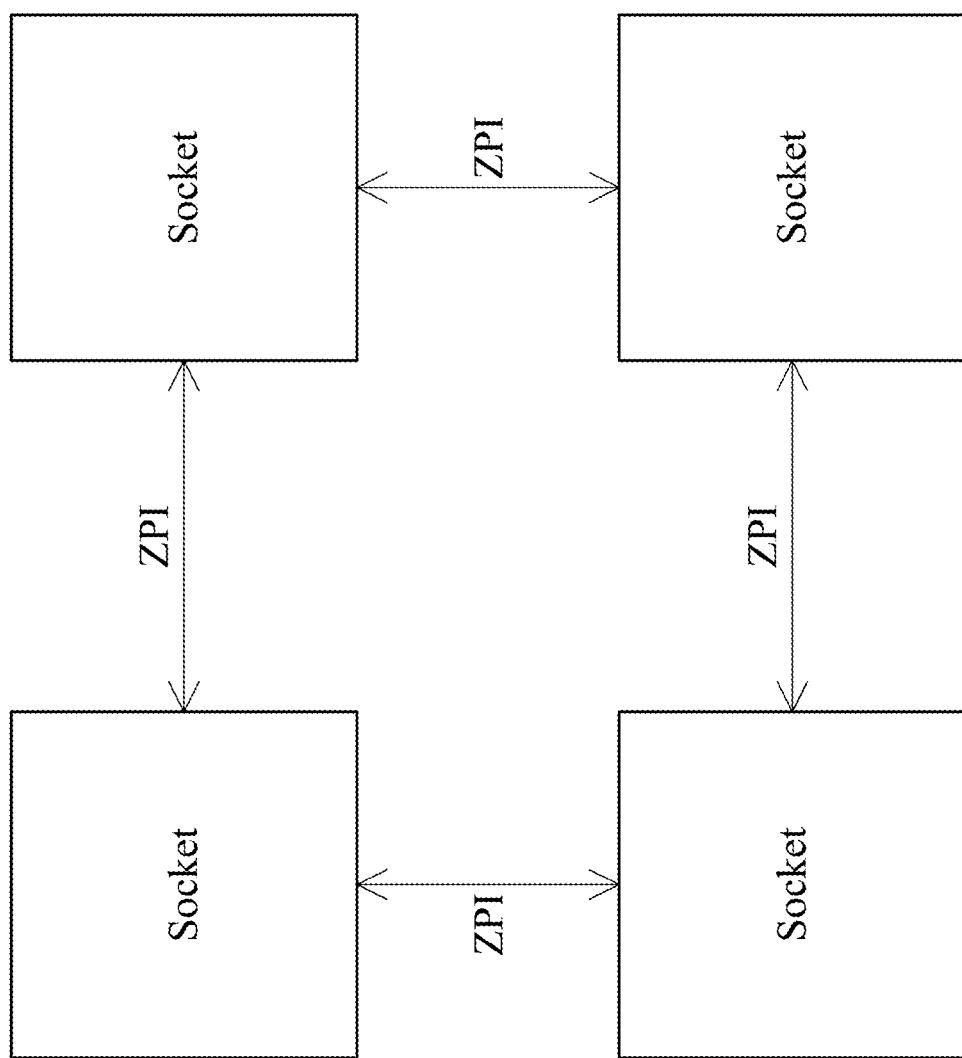
Figure 2C:
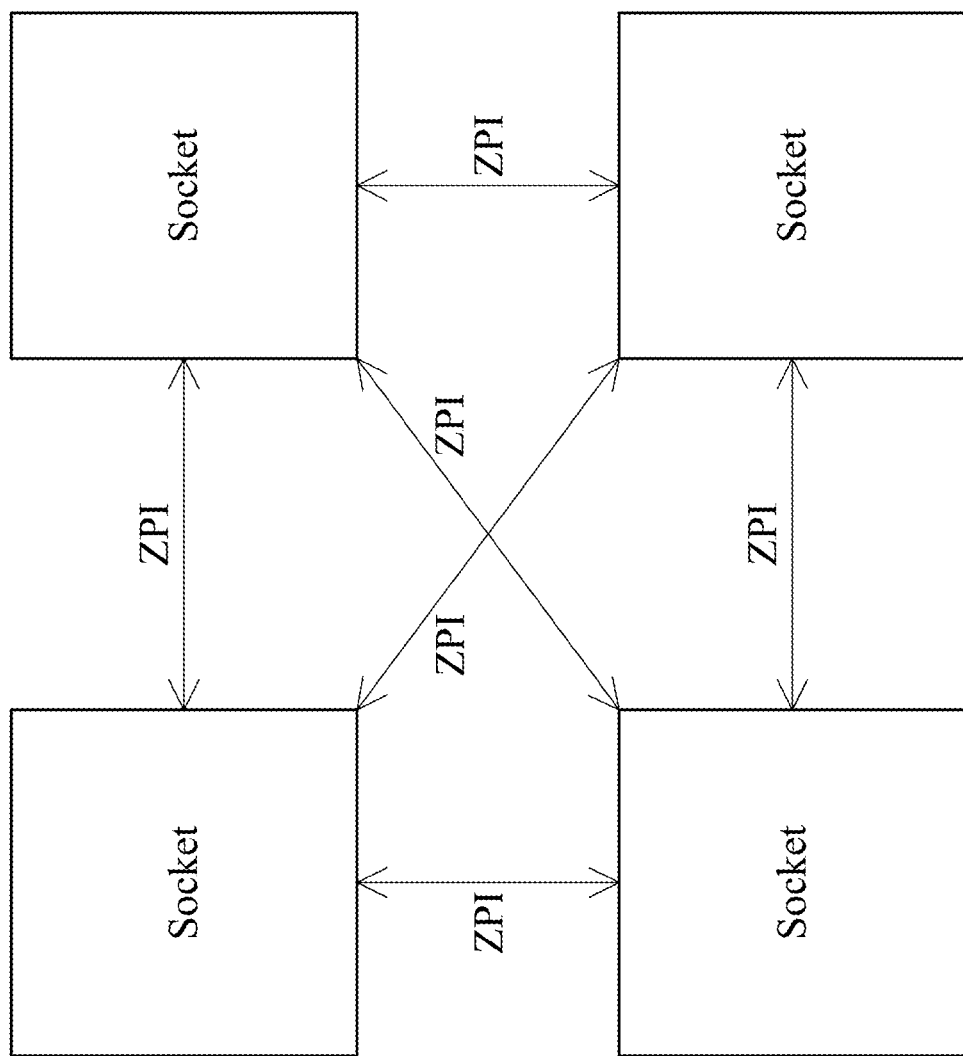

FIGS. 2A to 2C illustrate other planar interconnection embodiments between sockets connected by the socket-to-socket interconnect interface ZPI. FIGS. 2A and 2B use the interconnect interface ZPI to connect the sockets in a ring. FIG. 2A shows a ring of three sockets. FIG. 2B shows a ring of four sockets. FIG. 2C also shows four sockets. Compared with FIG. 2B, more connections using the socket-to-socket interconnect interface ZPI are shown in FIG. 2C, to ensure the shortest communication path between the different sockets. More sockets can be used to implement such planar interconnection structures.

Figure 3A:
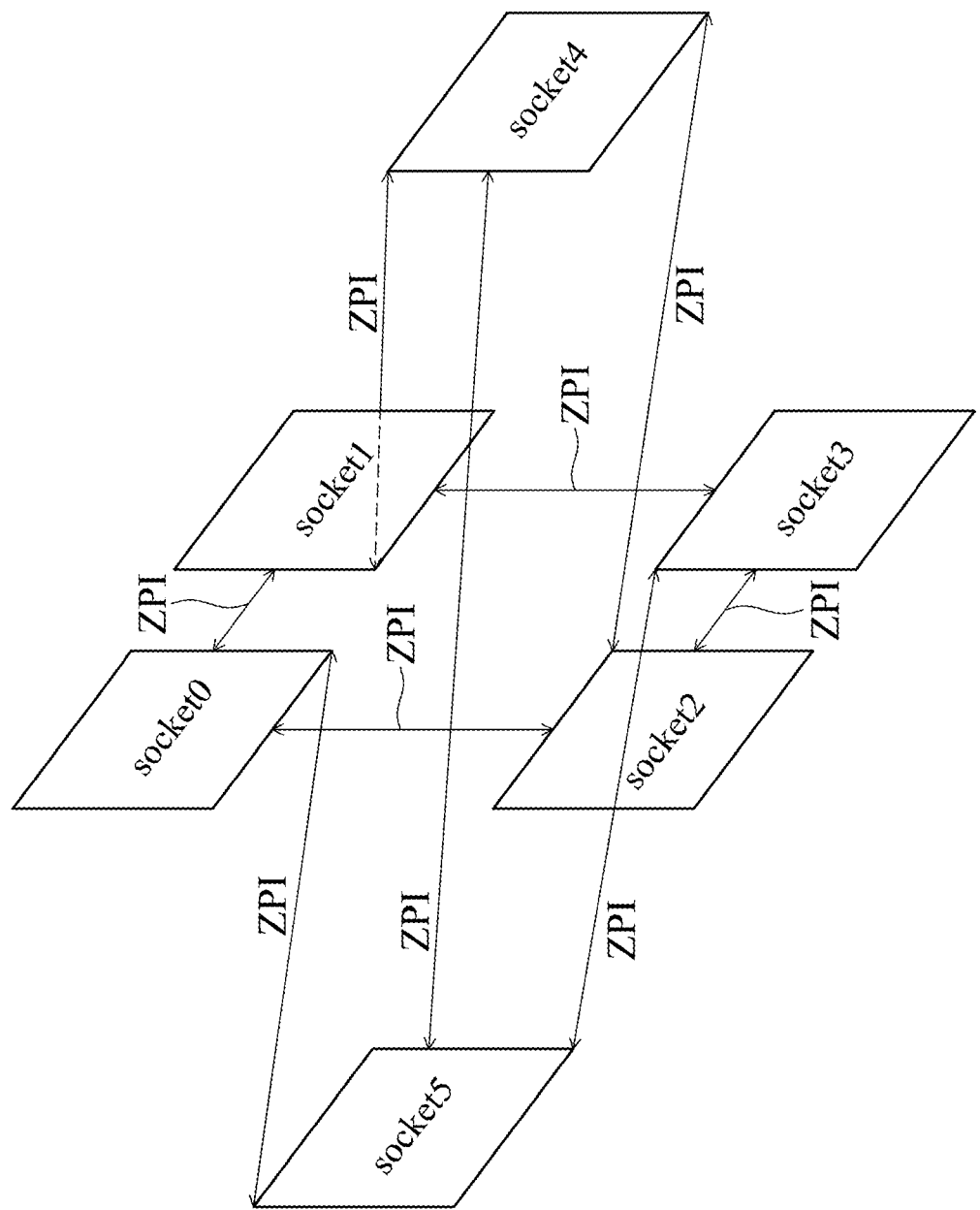
FIGS. 3A and 3B illustrate a three-dimensional (3D) interconnection embodiment between sockets connected by the socket-to-socket interconnect interface ZPI.
Figure 3B:
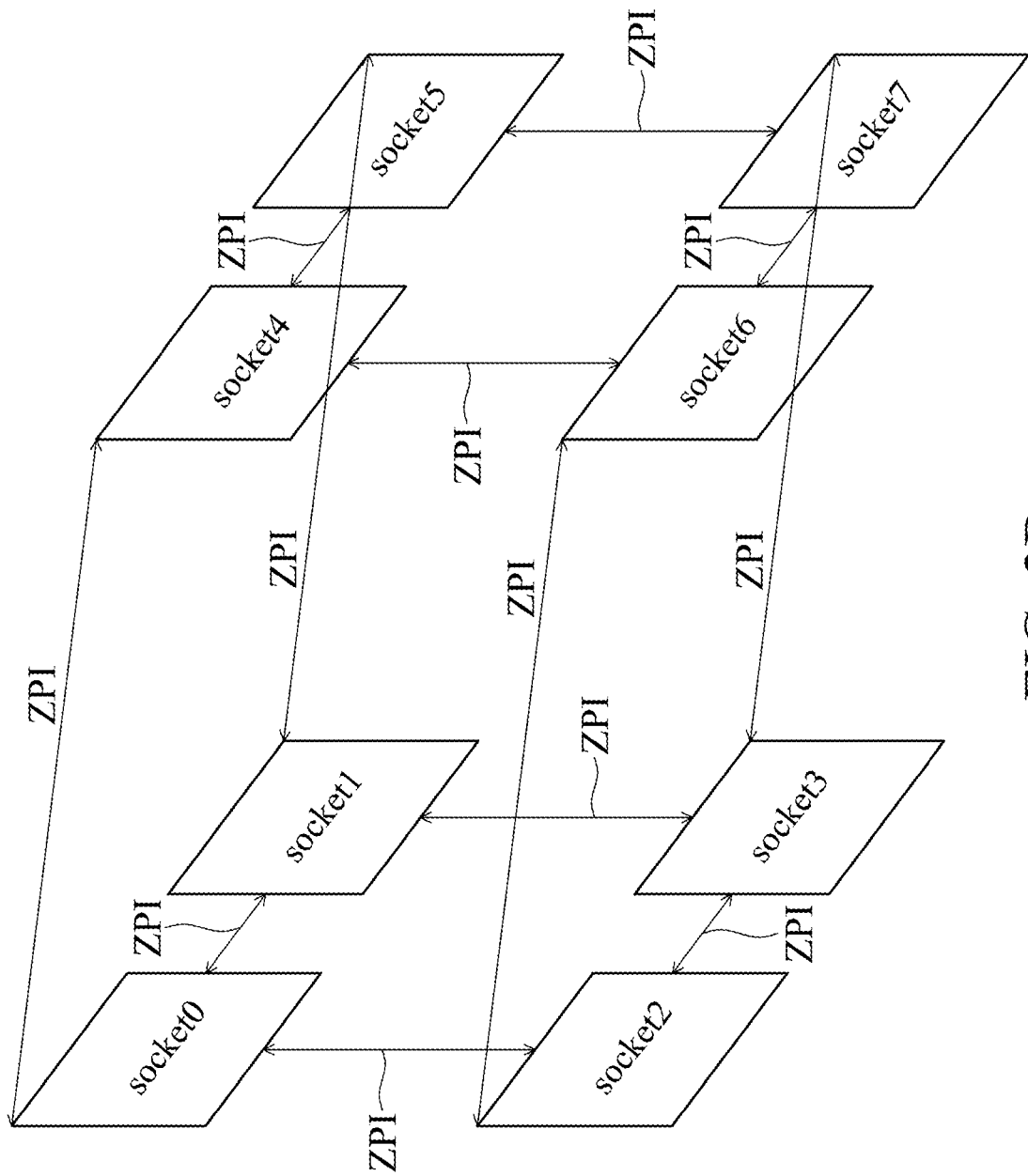

FIGS. 3A and 3B illustrate a three-dimensional (3D) interconnection embodiment between sockets connected by the socket-to-socket interconnect interface ZPI. FIG. 3A illustrates a three-layer interconnection structure. The four sockets socket0~socket3 form a plane (belonging to the same layer). There is one socket socket4 in the front layer. There is one socket socket5 in the back layer. In addition to the connection (through the socket-to-socket interconnect interface ZPI) that connects the middle layer with the front-layer socket socket4 and the back-layer socket socket5, the front-layer socket socket4 is further connected to the back-layer socket socket5 through the socket-to-socket interconnect interface ZPI. The different layers are connected in a ring. FIG. 3B shows a two-layer interconnection structure. The sockets socket0~socket3 in the first layer are connected to the sockets socket4~socket7 in the second layer one-to-one by the socket-to-socket interconnect interface ZPI. A three-dimensional interconnection structure can involve more layers. There may be more sockets in each layer.

In addition, the die-to-die interconnect interface that connects dies is introduced in the following paragraphs, which is named a ZDI interconnect interface.

Figure 4:
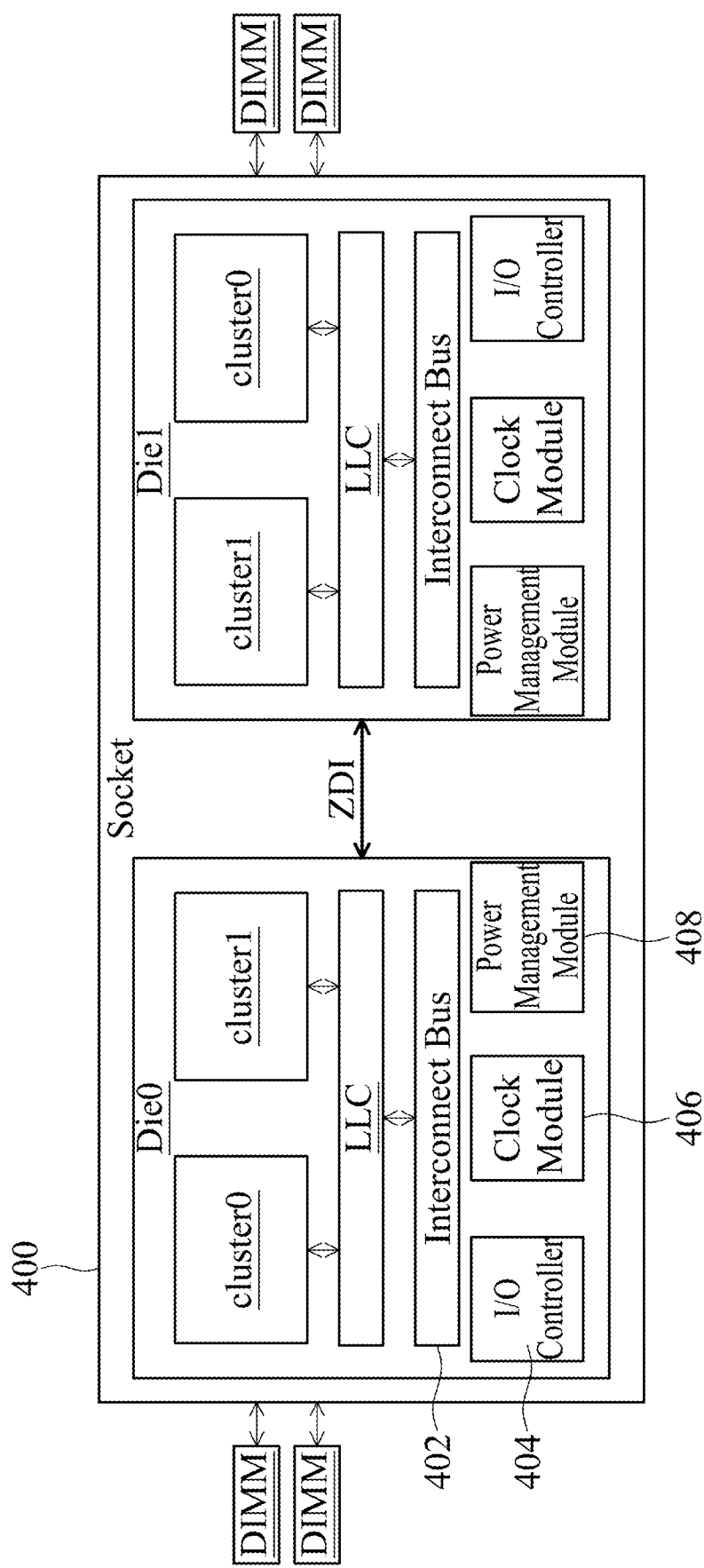
FIG. 4 illustrates the die-to-die interconnect interface ZDI in accordance with an exemplary embodiment of the present invention.

FIG. 4 illustrates the die-to-die interconnect interface ZDI in accordance with an exemplary embodiment of the present invention. The two dies Die0 and Die1 in the same socket 400 are connected through the die-to-die interconnect interface ZDI (also labeled ZDI). Other embodiments may have more dies packaged in the same socket. Each die may provide a plurality of clusters. As shown, there is a last level cache LLC, an interconnect bus 402, and various components (such as an input/output controller 404, a clock module 406, a power management module 408, etc.) in each die. It is not intended to limit the architecture of a die.

The socket-to-socket interconnect interface ZPI and the die-to-die interconnect interface ZDI can be used in combination for the communication between the dies in the different sockets.

Figure 5A:
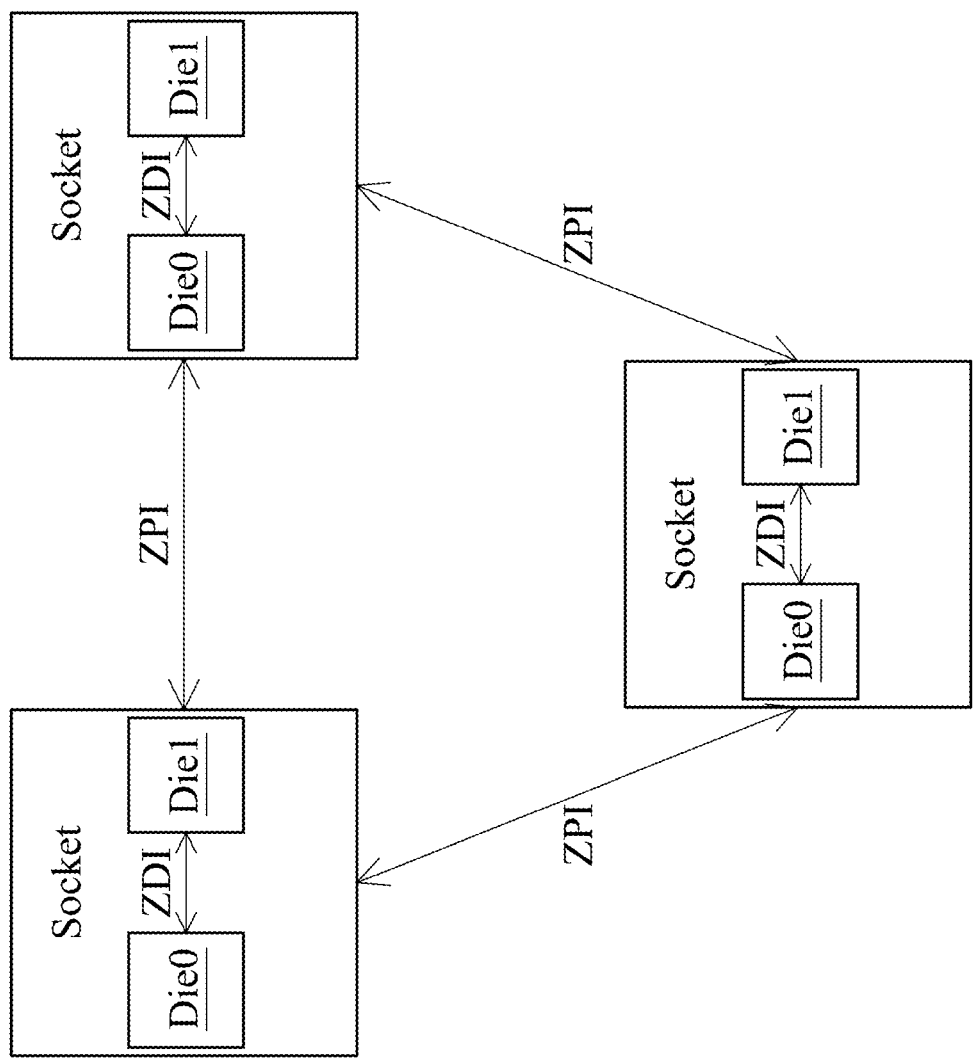
FIGS. 5A to 5C illustrate planar interconnection embodiments.
Figure 5B:
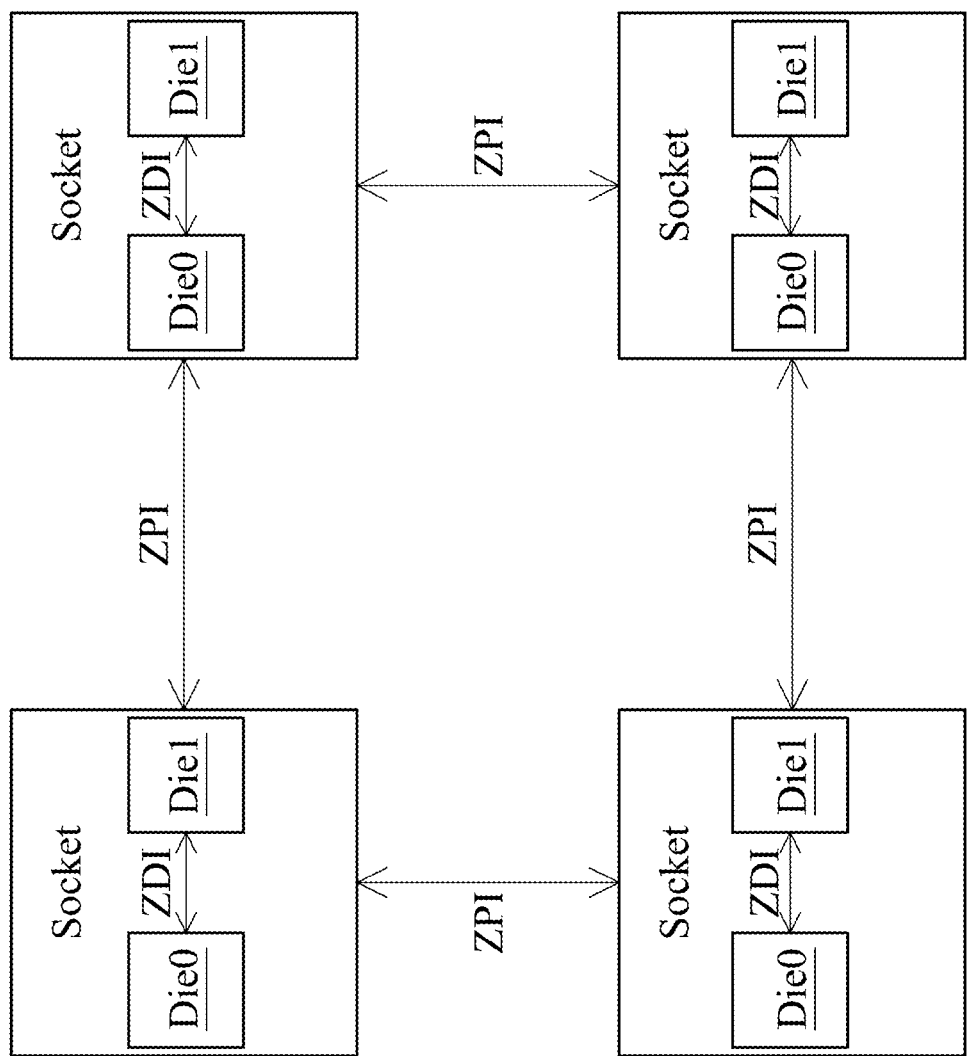
Figure 5C:
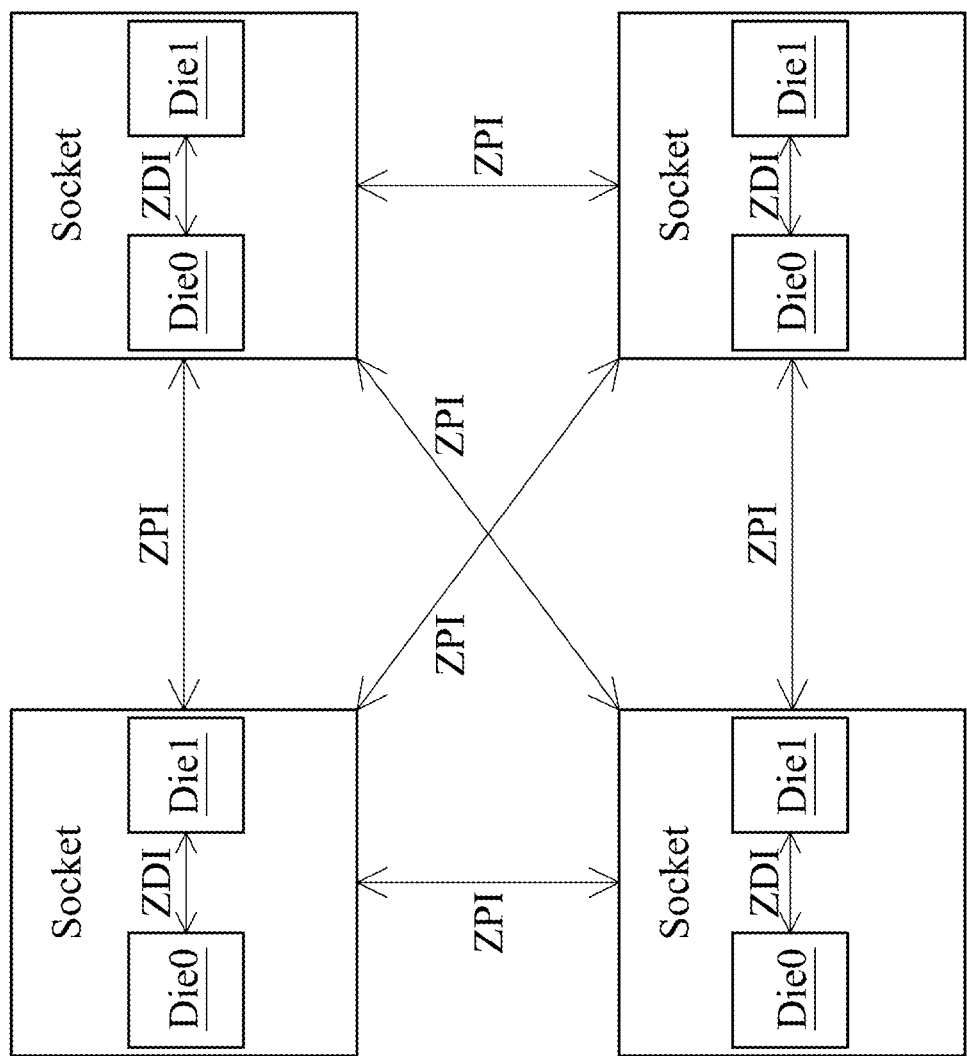

FIGS. 5A to 5C illustrate planar interconnection embodiments. The sockets are connected through the socket-to-socket interconnect interface ZPI, and the dies in the same socket are connected through the die-to-die interconnect interface ZDI. FIG. 5A illustrates a ring of three sockets connected through the socket-to-socket interconnect interface ZPI, and the dies in the same socket are connected through the die-to-die interconnect interface ZDI. In this manner, six dies form a system with shared resources. FIG. 5B illustrates a ring of four sockets connected through the socket-to-socket interconnect interface ZPI, and the dies in the same socket are connected through the die-to-die interconnect interface ZDI. In this manner, eight dies form a system with shared resources. Compared with FIG. 5B, more connections using the socket-to-socket interconnect interface ZPI are shown in FIG. 5C, to ensure the shortest communication path between the dies in the different sockets. In other exemplary embodiment, each socket may include the other number of dies.

Figure 6A:
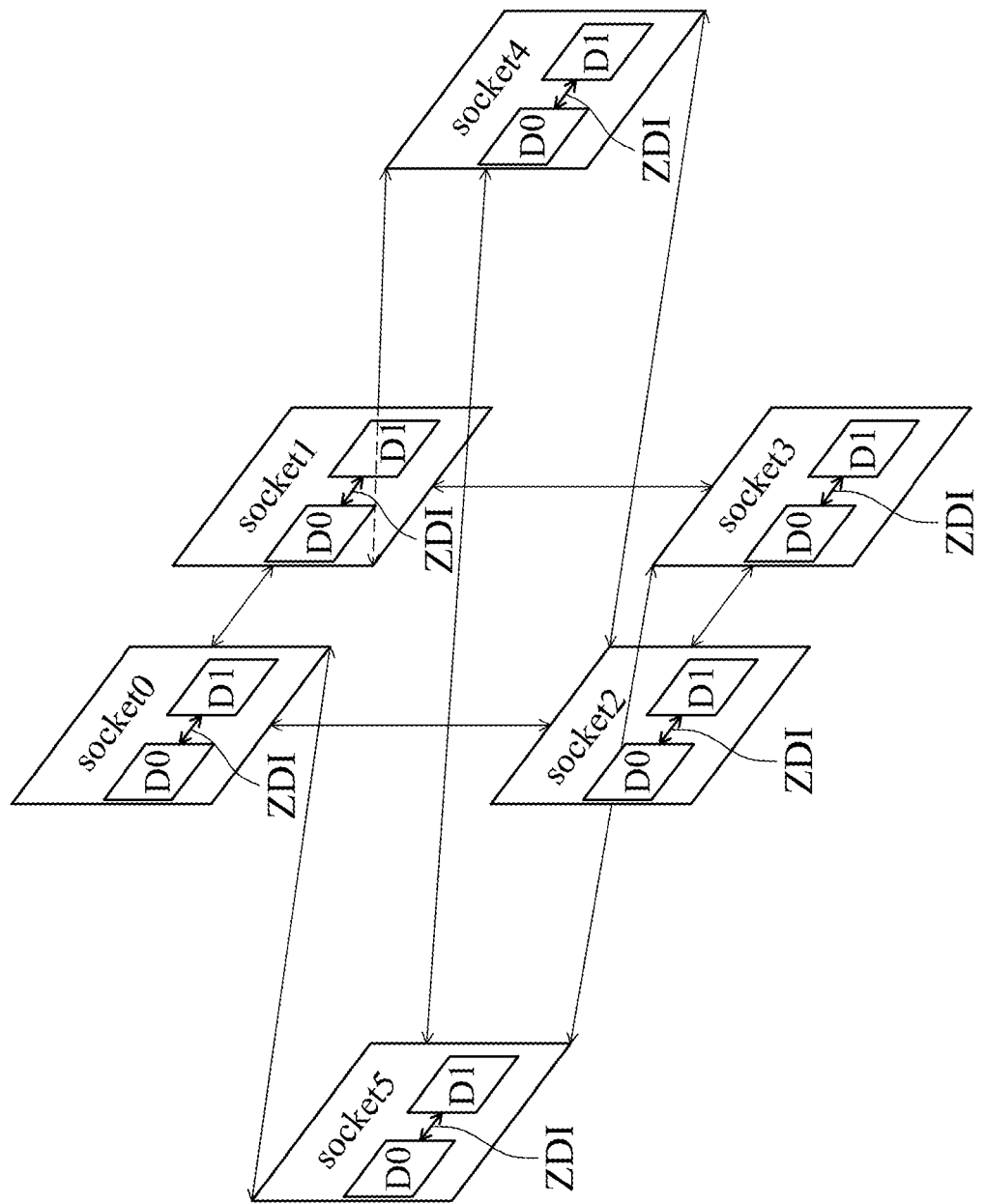
FIGS. 6A and 6B illustrate a three-dimensional interconnection embodiment.
Figure 6B:
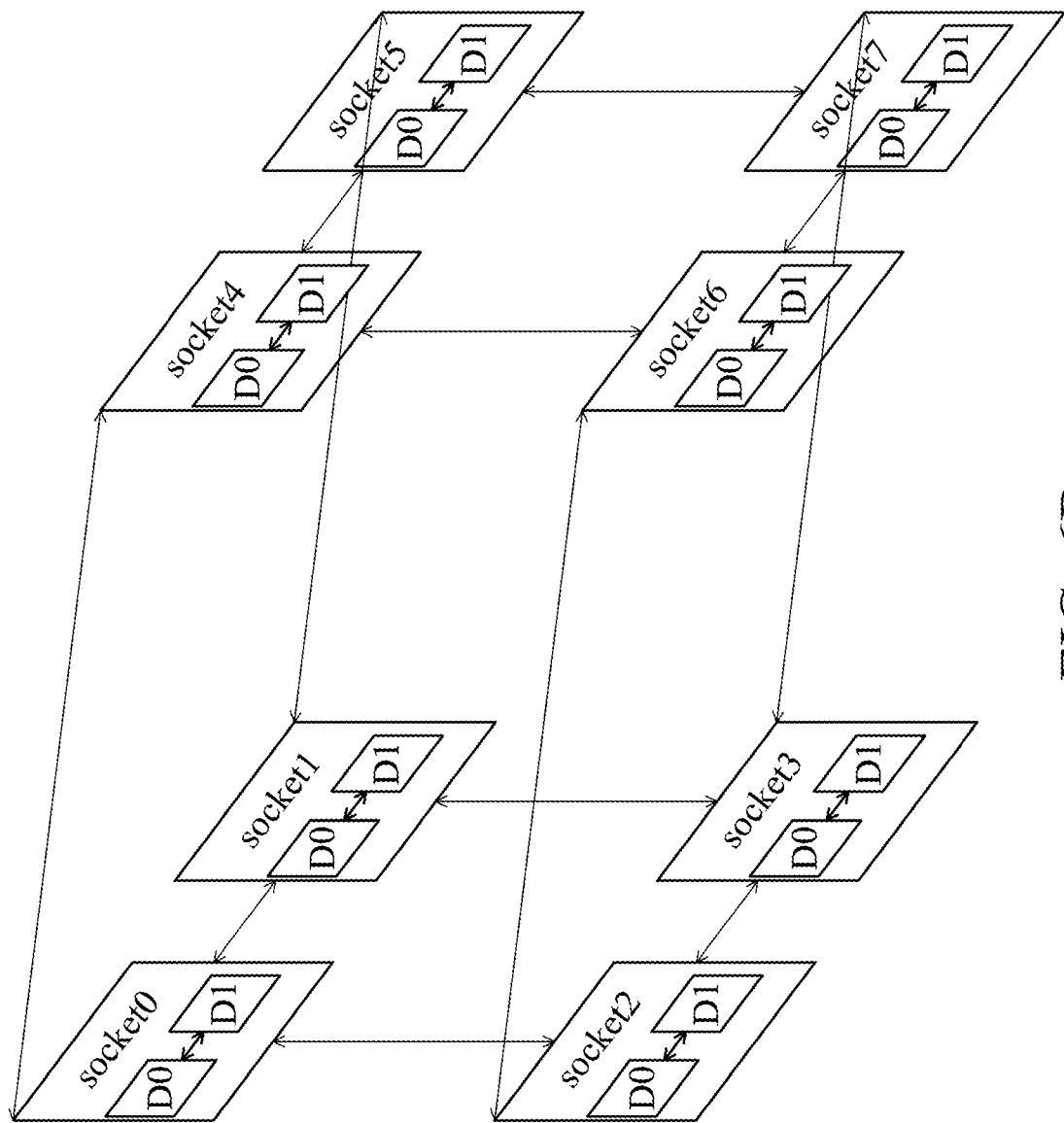

FIGS. 6A and 6B illustrate a three-dimensional interconnection embodiment. The sockets are connected through the socket-to-socket interconnect interface ZPI, and the dies in the same socket are connected through the die-to-die interconnect interface ZDI. FIG. 6A illustrates a three-layer architecture. Each layer may include just one single socket or a plane of sockets. Each socket may include a plurality of dies (such as D0, D1). The three layers may be connected in a ring through the socket-to-socket interconnect interface ZPI. Each die is regarded as a node in the system and can control the resources of the other nodes. FIG. 6B illustrates the double-layer architecture. In the two planes, each socket includes a plurality of dies. Each die in the double-layer architecture is regarded as a node in the system and can control the resources of the other nodes. The three-dimensional interconnection structure can be expanded to more layers, and there may be the other number of dies in each socket. In a chipset application, the interconnect interfaces ZPI and ZDI of the present invention can be used as follows.

Figure 7:
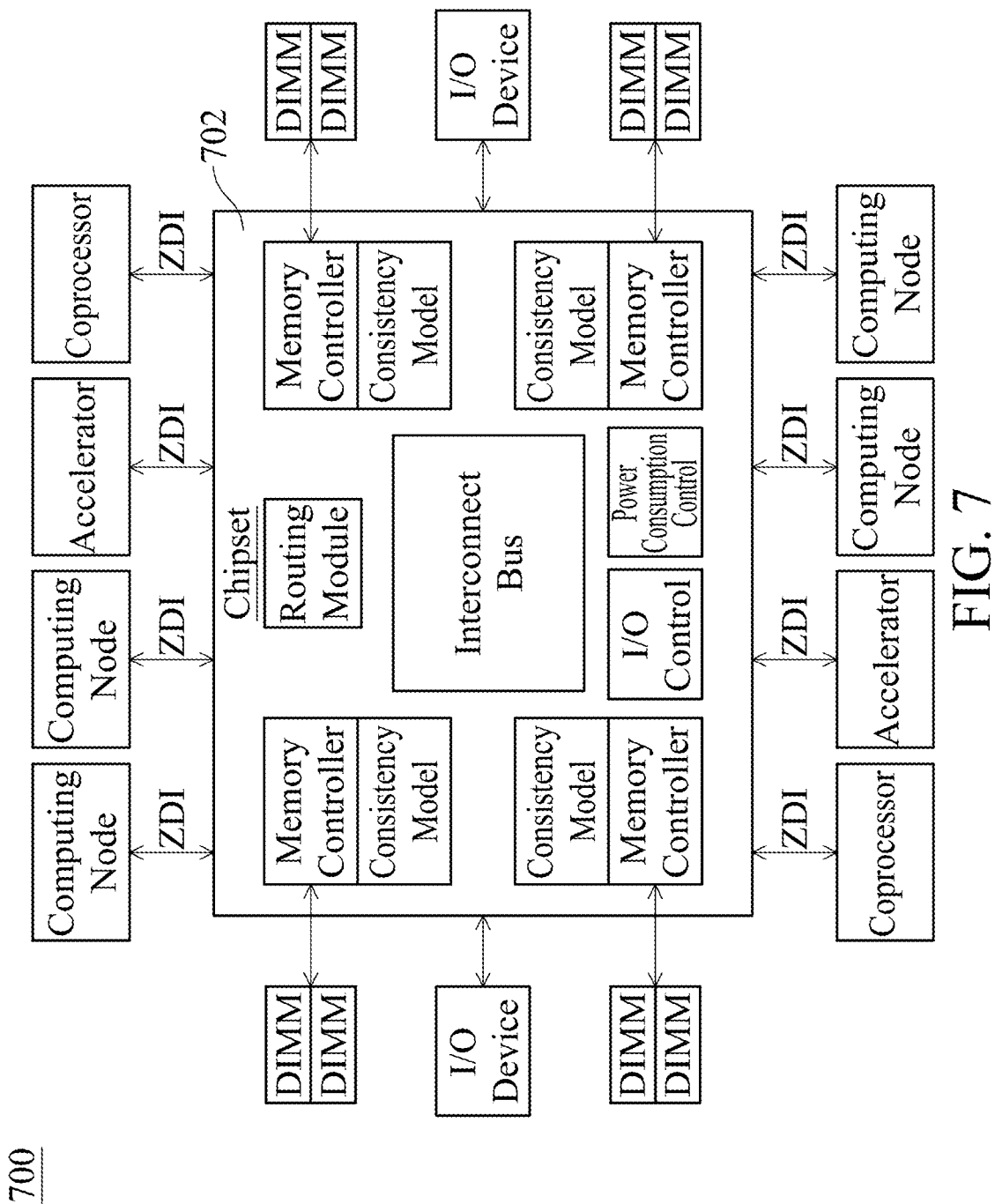
FIG. 7 illustrates a socket 700 that includes a chipset 702 (a die) and other chips (e.g., a plurality of dies of computing nodes, coprocessors, and accelerators)

FIG. 7 illustrates a socket 700 that includes a chipset 702 (a die) and other chips (e.g., a plurality of dies of computing nodes, coprocessors, and accelerators). The chipset 702 is connected to other chips (the computing nodes, coprocessors, and accelerators) through the die-to-die interconnect interface ZDI. In order to form a larger system, multiple chipset sockets can be connected through the socket-to-socket interconnect interface ZPI to form the planar interconnection structure shown in FIGS. 2A-2C or the three-dimensional interconnection structure in FIGS. 3A and 3B. In another exemplary embodiment, multiple chipsets may be packed in the same socket. Such sockets may be connected through the socket-to-socket interconnect interface ZPI as those planar interconnection structure shown in FIGS. 5A to 5C or the 3D interconnection structure shown in FIGS. 6A, 6B, and thereby a huge system is established.

Figure 8:
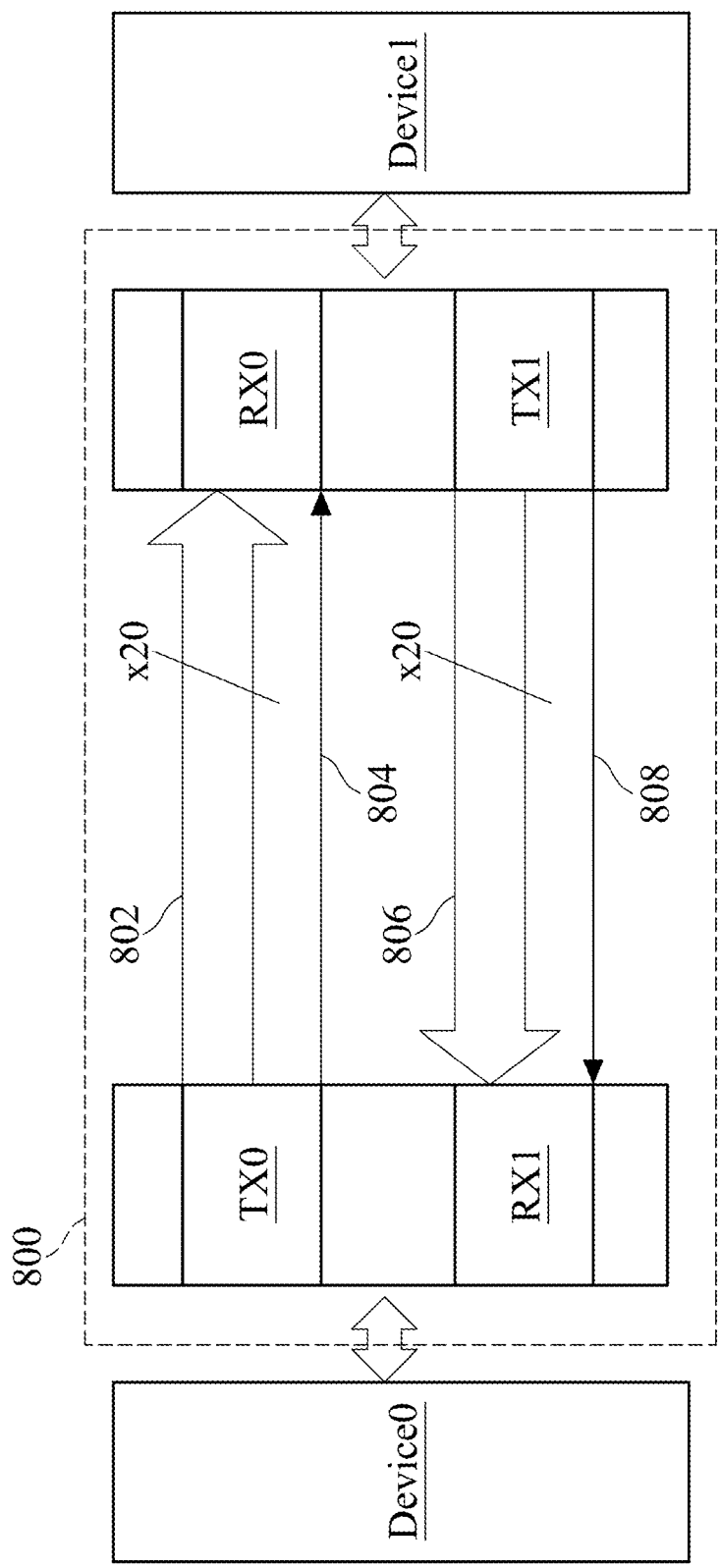
FIG. 8 illustrates the communication architecture of the interconnect interface ZPI/ZDI disclosed in the present invention.

FIG. 8 illustrates the communication architecture of the interconnect interface ZPI/ZDI disclosed in the present invention. The interconnect interface 800 establishes a two-way transmission channel between the connected devices Device0 and Device1. It is a full-duplex design and allows simultaneous transmission in the opposite directions. In an exemplary embodiment, the devices Device0 and Device1 are two separated sockets, and the interconnect interface 800 is a socket-to-socket interconnect interface ZPI. In another exemplary embodiment, the devices Device0 and Device1 are two dies, and the interconnect interface 800 is a die-to-die interconnect interface ZDI.

The interconnect interface 800 provides a transmitter TX0 at the device Device0, and provides a receiver RX0 at the device Device1. From the device Device0 to the device Device1, packets 802 and a clock signal 804 are transmitted by the transmitter TX0 and received by the receiver RX0. For the data transmission in the opposite direction, the interconnect interface 800 further provides a transmitter TX1 at the device Device1, and a receiver RX1 at the device Device0. From the device Device1 to the device Device0, packets 806 and a clock signal 808 are transmitted by the transmitter TX1 and received by the receiver RX1.

Figure 9A:
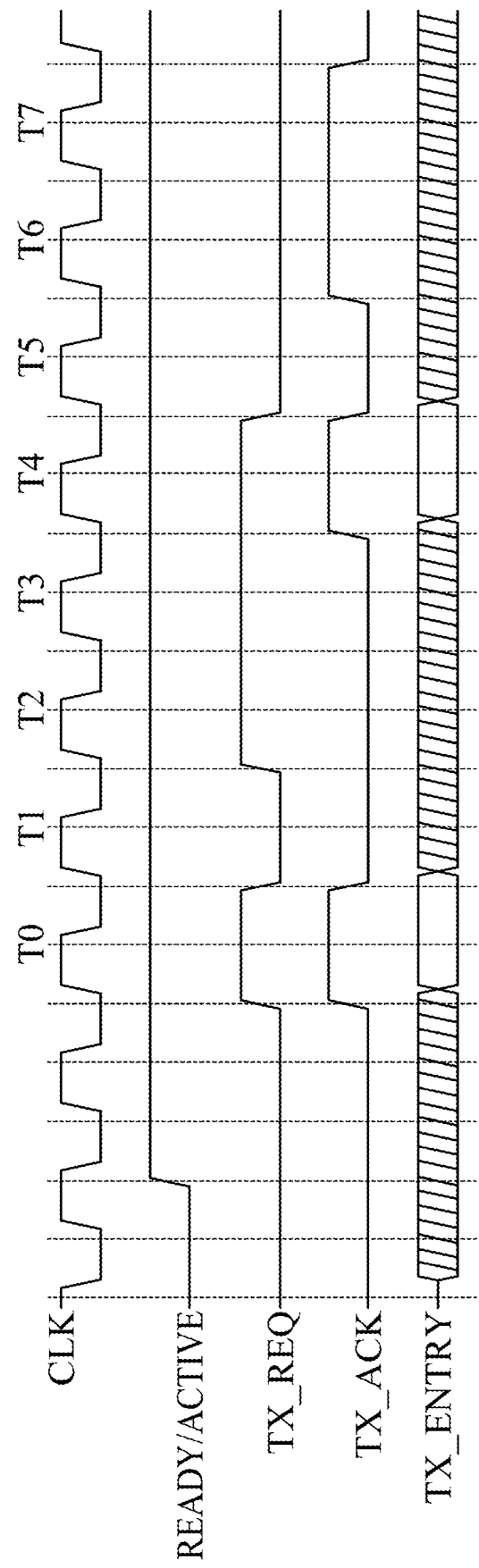
FIGS. 9A and 9B show waveform diagrams, for discussion of the input and output (I/O) protocol of the interconnect interface ZPI/ZDI.
Figure 9B:
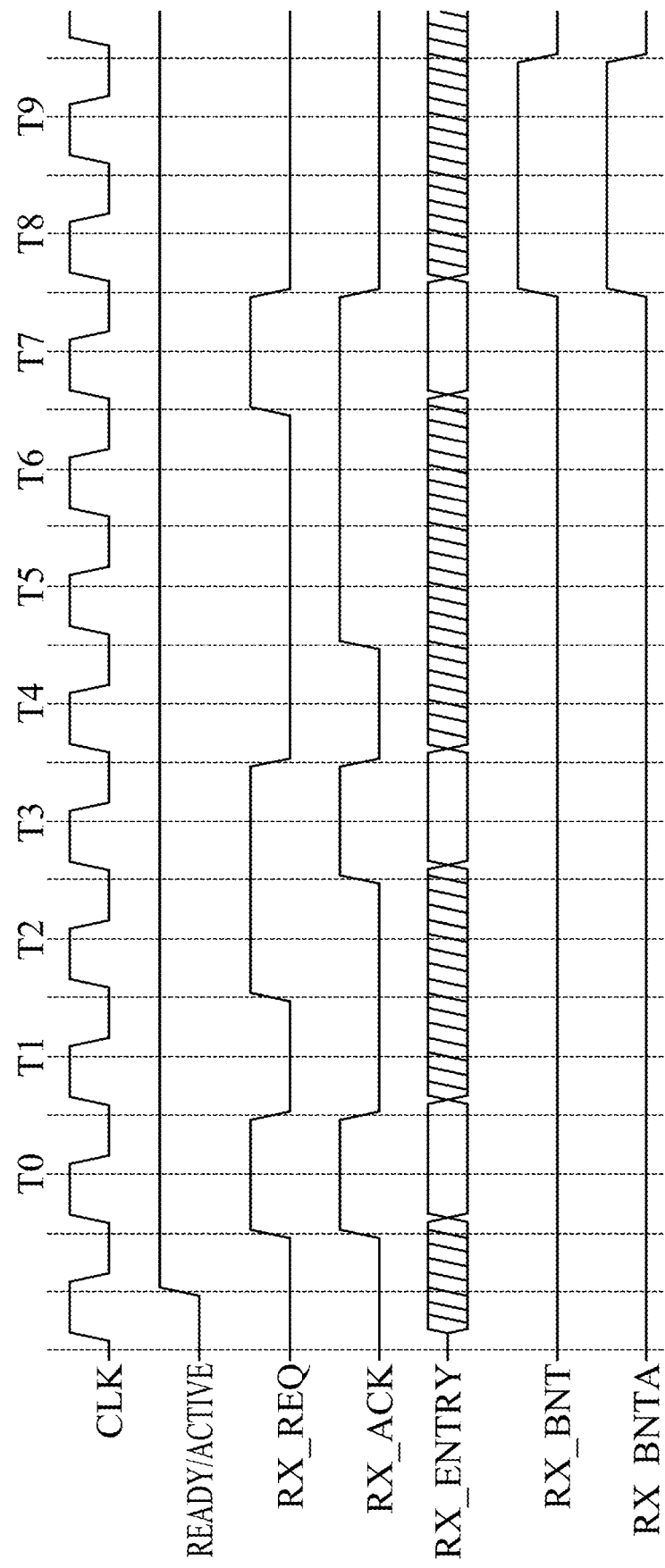

FIGS. 9A and 9B show waveform diagrams, for discussion of the input and output (I/O) protocol of the interconnect interface ZPI/ZDI.

The data signal TX_ENTRY of a source device is transmitted by a transmitter TX that the interconnect interface ZPI/ZDI provides at the source end. The data signal TX_ENTRY is transferred by the transmission line of the interconnect interface ZPI/ZDI, and then is received by a receiver RX that the interconnect interface ZPI/ZDI provides at the destination end. Thus, the destination device receives the data signal TX_ENTRY.

FIG. 9A depicts the handshake communication between the source device and the transmitter TX of the interconnect interface ZPI/ZDI. According to the handshaking, the transmitter TX obtains the TX transmission sequence from the source device.

First, the signal READY/ACTIVE is pulled up to indicate that the interconnect interface ZPI/ZDI indeed establishes a connection. Referring to the clock signal CLK, in T0, the source device pulls up a signal TX_REQ and, in response to the low-to-high change of TX_REQ, the transmitter TX pulls up a signal TX_ACK. The handshake behavior announces the transfer of the data signal TX_ENTRY from the source device to the transmitter TX. In T1, the signals TX_REQ and TX_ACK are pulled down, and the data is halted without being transferred from the source device. In T2 and T3, the source device pulls up the signal TX_REQ again, but the transmitter TX does not pull up the signal TX_ACK in return; it means that although the source device has prepared the data signal, the transmitter TX has not yet got ready to receive the data signal from the source device. In T4, the signals TX_REQ and TX_ACK are both high, and the source device outputs the data signal TX_ENTRY to the transmitter TX. The transmitter TX successfully receives the data signal from the source device. In T5, the status of the signals TX_REQ and TX_ACK are similar to that in T1, handshake between the source device and the transmitter TX happens again. This time, the handshake behavior announces the end of the data transfer from the source device to the interconnect interface ZPI/ZDI. In T6 and T7, the transmitter TX is ready to receive data from the source device (the signal TX_ACK is asserted), but the source device has no data (the signal TX_REQ is low).

FIG. 9B depicts the handshake communication between the receiver RX of the interconnect interface ZPI/ZDI and the destination device. According to the handshaking, the RX transmission sequence received by the receiver RX is transferred to the destination device.

First, the signal READY/ACTIVE is pulled up to indicate that the interconnect interface ZPI/ZDI indeed establishes a connection. Referring to the clock signal CLK, in T0, the receiver RX of the interconnect interface ZPI/ZDI pulls up a signal RX_REQ and, in response to the low-to-high change of RX_REQ, the destination device pulls up a signal RX_ACK. The handshake behavior announces the transfer of the data signal RX_ENTRY from the receiver RX to the destination device. In T1, the signals RX_REQ and RX_ACK are pulled down, and the data is halted without being output from the receiver RX. In T2, the receiver RX pulls up the signal RX_REQ again, but the destination device does not pull up the signal RX_ACK in return; it means that although the receiver RX has prepared the data signal, the destination device has not yet got ready to receive the data signal from the receiver RX. In T3, the signals RX_REQ and RX_ACK are both high, and the data signal RX_ENTRY that the receiver RX receives from the transmission line of the interconnect interface ZPI/ZDI is transferred to the destination device. The destination device successfully receives the data signal from the receiver RX. In T4, the status of the signals RX_REQ and RX_ACK are similar to that in T1, handshake between the receiver RX and the destination device happens again. This time, the handshake behavior announces the end of the data transfer from the interconnect interface ZPI/ZDI to the destination device. In T5 and T6, the destination device is ready to receive data from the receiver RX (the signal RX_ACK is asserted), but the receiver RX has no data (the signal RX_REQ is low). In T7, the signals RX_REQ and RX_ACK are pulled up for handshaking. Again, the handshake behavior announces the transfer of the data signal RX_ENTRY from the receiver RX to the destination device. However, the destination device may have a mechanism to refuse to receive data. For example, the destination device may refuse to receive data from the interconnect interface ZPI/ZDI in consideration of its buffer capability or other factors. In T8 and T9, the destination device pulls up the signal RX_BNT to request to block the incoming data, and the receiver RX pulls up signal RX_ACK as a response, to acknowledge the safe reception of the block request from the destination device.

Figure 10:
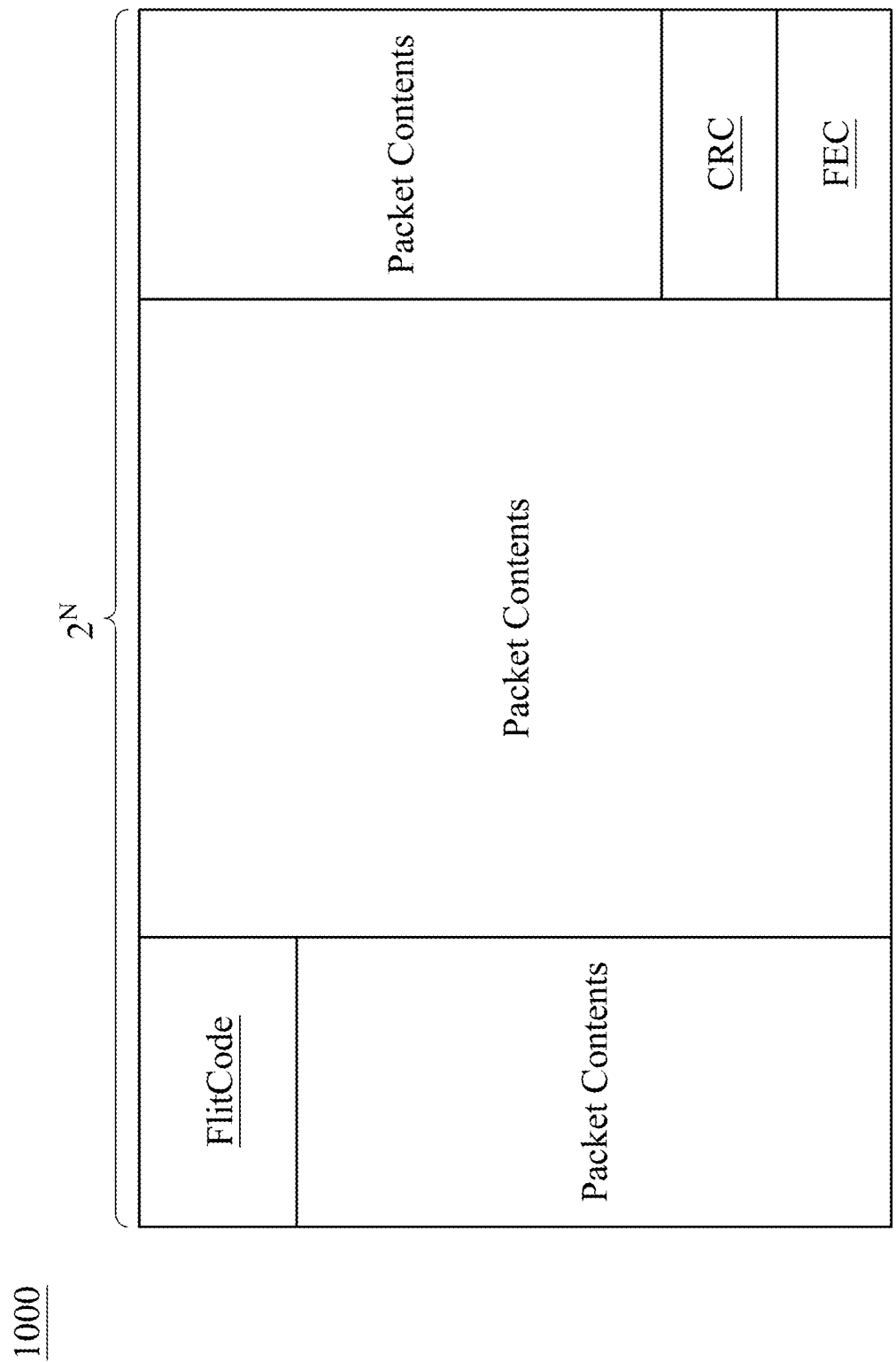
FIG. 10 illustrates a format 1000 of the packets (or named flits) transferred through the interconnect interface ZPI/ZDI in accordance with an exemplary embodiment of the present invention.

FIG. 10 illustrates a format 1000 of the packets (or named flits) transferred through the interconnect interface ZPI/ZDI in accordance with an exemplary embodiment of the present invention. The information presented in the format 1000 includes a unit code FlitCode, packet contents, cyclic redundancy checking code CRC, and channel coding (or forward error correction code) FEC. When implementing the socket-to-socket interconnect interface ZPI, the length of the format 1000 is $2^N$ bits, which is a non-fixed length. When implementing the die-to-die interconnect interface ZDI, the length of the format 1000 is a fixed length.

The unit code FlitCode may include 5 bits, and its meaning is as follows:
****_1: (TLB enable), which means that the packet contents are taken from the data signal TX_Entry;
****_0: (TLB disable), which means that the packet contents are dummy data generated by the interconnect interface ZPI/ZDI rather than data taken from the data signal TX_Entry;
000**_*: (ACK/NAK DLLP), operative to transfer a retry request;
01**_*: (FCI/FCU DLLP), operative to return the buffer status of the receiver RX;
1000_*: (PM related DLLP), for power management;
1100_*; (DLLP disable), indicating that the packet contents do not contain valid data;
1111_*: (Reserved for PHY), operative to transfer a start, ending, or idle flag about the transmission.

Figure 11A:
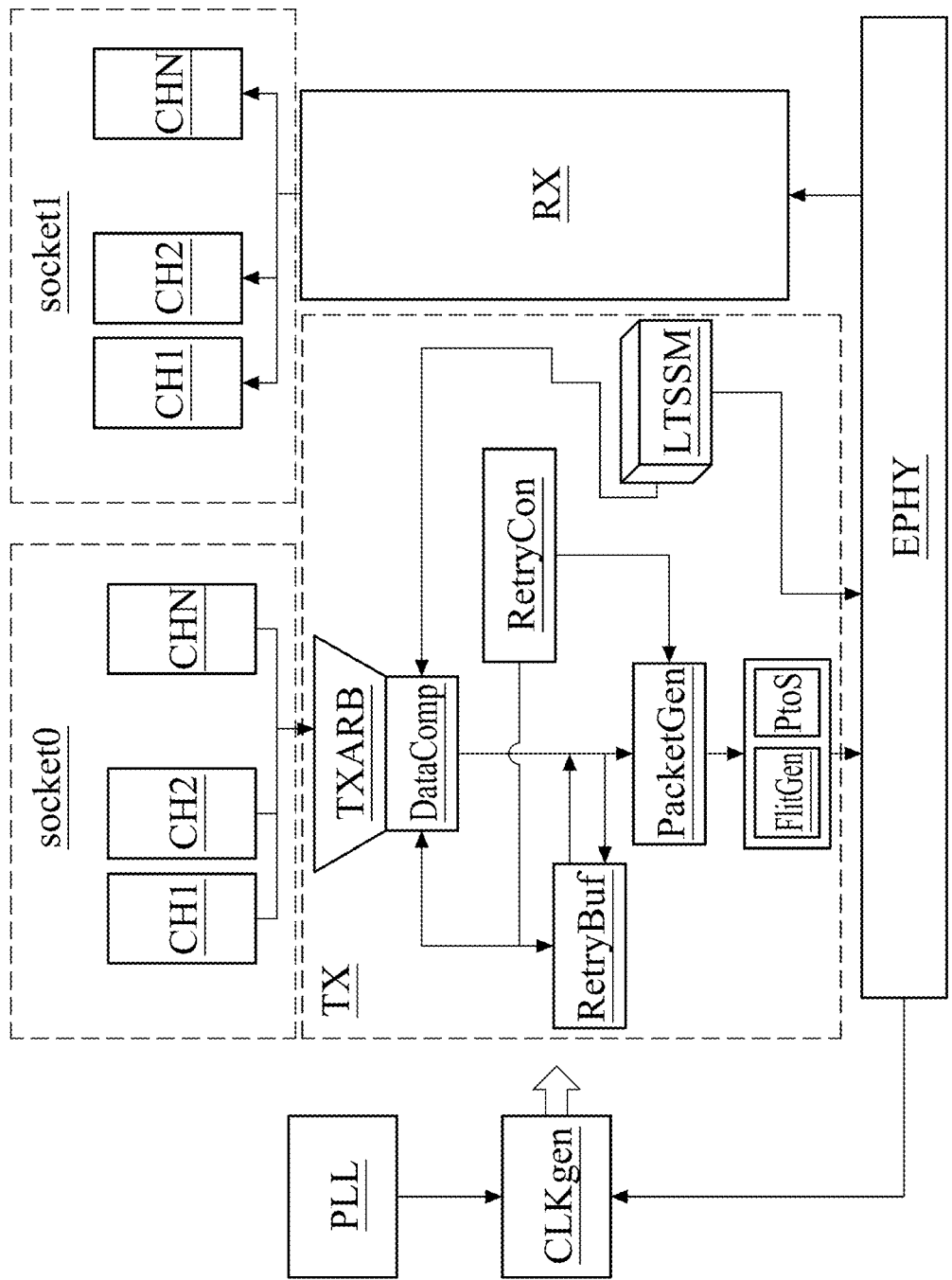
FIGS. 11A and 11B illustrate the data path and the hardware structure of the socket-to-socket interconnect interface ZPI between two sockets socket0 and socket1 in accordance with an exemplary embodiment of the present invention.
Figure 11B:
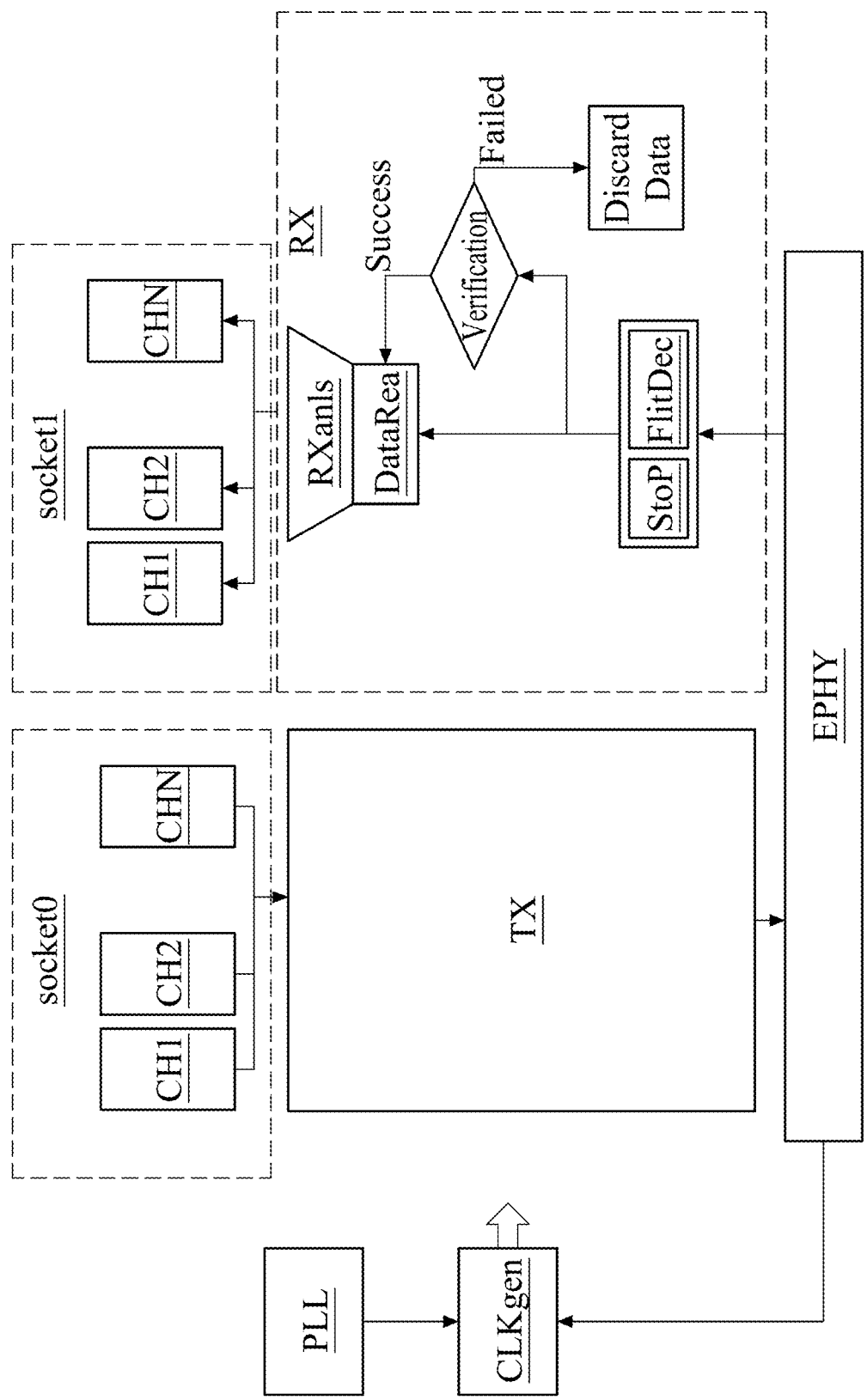

FIGS. 11A and 11B illustrate the data path and the hardware structure of the socket-to-socket interconnect interface ZPI between two sockets socket0 and socket1 in accordance with an exemplary embodiment of the present invention. As shown, the socket socket0 is connected to a transmitter TX provided by the socket-to-socket interconnect interface ZPI. The transmitter TX transmits a data signal obtained from the socket socket0 to the electrical physical layer EPHY of the socket-to-socket interconnect interface ZPI and thereby the data signal is transferred to a receiver RX of the socket-to-socket interconnect interface ZPI. The receiver RX passes the received data signal to the socket socket1 that is at another end of the socket-to-socket interconnect interface ZPI. According to a full-duplex design, another path from socket1 to socket0 provided by the socket-to-socket interconnect interface ZPI is in the same structure. The clock signal for the socket-to-socket interconnect interface ZPI is generated by a phase-locked loop PLL and a clock generator CLKgen.

FIG. 11A depicts the details of the transmitter TX. Various types of data in the socket socket0 are sent to the arbiter TXARB of the transmitter TX, via different channels CH1~CHN, for arbitration. The data that wins the arbitration is compressed by a data compressor DataComp, and sent to the packet generator PacketGen to be packed into packets (or named flits, referring to the format 1000). When the socket socket0 does not request to transmit data, a dummy packet generator FlitGen in the socket-to-socket interconnect interface ZPI may generator empty packets by packing dummy contents for transmission. Through the parallel-to-serial converter PtoS, the packets are transferred to the receiver RX at the other end of the socket-to-socket interconnect interface ZPI via the electrical physical layer EPHY, and then delivered to the proper channel from among the channels CH1~CHN in the socket socket1 according to the data type.

The socket-to-socket interconnect interface ZPI may use pipelined hardware. Referring to the transmitter TX, when the packet generator PacketGen is packing the first batch of data, at the same time, the data compressor DataComp are compressing the second batch of data and the arbiter TXARB are performing arbitration to get the third batch of data. The socket-to-socket interconnect interface ZPI operates efficiently.

The transmitter TX can back up the transmission data in a buffer RetryBuf. If the receiver RX finds that the data received from the electrical physical layer EPHY is incorrect, the retransmission mechanism is activated. The retransmission controller RetryCon gets the backup data from the buffer RetryBuf, and the packet generator PacketGen packs it into a packet again for retransmission. In an exemplary embodiment, the receiver RX of the socket socket1 issues the retransmission request, and provides the retransmission request to a transmitter TX that the socket-to-socket interconnect interface ZPI provided at the socket socket1 (the transmitter TX at the socket socket1 is not shown in FIG. 11A, and also has a retransmission controller RetryCon). As shown in FIG. 8, the transmitter TX0 and the receiver RX1 are planned at the socket socket0 and the transmitter TX1 and the receiver RX0 are planned at the socket socket1. When the receiver RX0 at the socket socket1 fails to verify the received data, the socket socket1 can output a retransmission request to be transmitted from the transmitter TX1 at the socket socket1, transferred through the electrical entity layer EPHY, and then received by the receiver RX1 at the socket socket0 According to the retransmission request, the transmitter TX0 at the socket socket0 then drives its retransmission controller RetryCon to take out the backup data from the buffer RetryBuf for retransmission.

Furthermore, there is a state machine LTSSM for controlling the transmission rate of the socket-to-socket interconnect interface ZPI. In an exemplary embodiment, the state machine LTSSM can switch the socket-to-socket interconnect interface ZPI to a lower speed state. The state machine LTSSM may suspend the arbiter TXARB and the data compressor DataComp, so that no data is input the packet generator PacketGen for packing and, accordingly, the speed of the socket-to-socket interconnect interface ZPI is reduced. The state machine LTSSM may further control the transmission rate of the electrical physical layer EPHY to achieve the speed reduction of the socket-to-socket interconnect interface ZPI. In another exemplary embodiment, the state machine LTSSM is switched to the low-speed state in response to a low power consumption setting of the socket socket0 In another exemplary embodiment, the receiver RX may have no more space to receive data. For example, the buffer in the receiver RX may be full. In this situation, the socket socket1 may send a slow-down request to the socket socket0 (via the another path not shown in the figure). According to the slow-down request from the socket socket1, the socket socket0 operates the state machine LTSSM to change the transmission rate of the socket-to-socket interconnect interface ZPI.

Referring to FIG. 8, when the buffer in the receiver RX is full, the socket socket1 may output a slow-down request, which is transmitted by the transmitter TX1, and sent to the receiver RX1 through the electrical physical layer EPHY. The socket socket0 receives the slow-down request and switches the state machine LTSSM to the low-speed state.

In an exemplary embodiment, the parallel-to-serial converter PtoS includes a buffer for realizing the speed reduction. When the state machine LTSSM is switched to reduce the transmission rate of the electrical physical layer EPHY, the data that cannot be transmitted to the other end yet may be temporarily stored in the buffer.

FIG. 11B depicts the details of the receiver RX. The packets received from the electrical physical layer EPHY is converted by the serial-to-parallel converter StoP, decoded by the decoder FlitDec, and verified by a verification logic module for error checking. The verification logic module may refer to the cyclic redundancy checking code CRC and forward error correction code FEC. If the verification fails, the receiver RX will ignore the received data and trigger the aforementioned retransmission mechanism. If the verification successes, the received data is rearranged by the data rearrangement module DataRea, and then distributed to the proper channel among the channels CH1 . . . CHN of the socket socket1 according an analysis of an analysis module RXanls, to complete the transmission from the socket socket0 to the socket socket1 through the socket-to-socket interconnect interface ZPI.

The receiver RX may be implemented by pipelined hardware, too. When the analysis module RXanls is analyzing the first batch of data, at the same time, the data rearrangement module DataRea is rearranging the second batch of data for verification, and the decoder FlitDec is decoding the third batch of data. A high-performance socket-to-socket interconnect interface ZPI is provided.

Figure 12A:
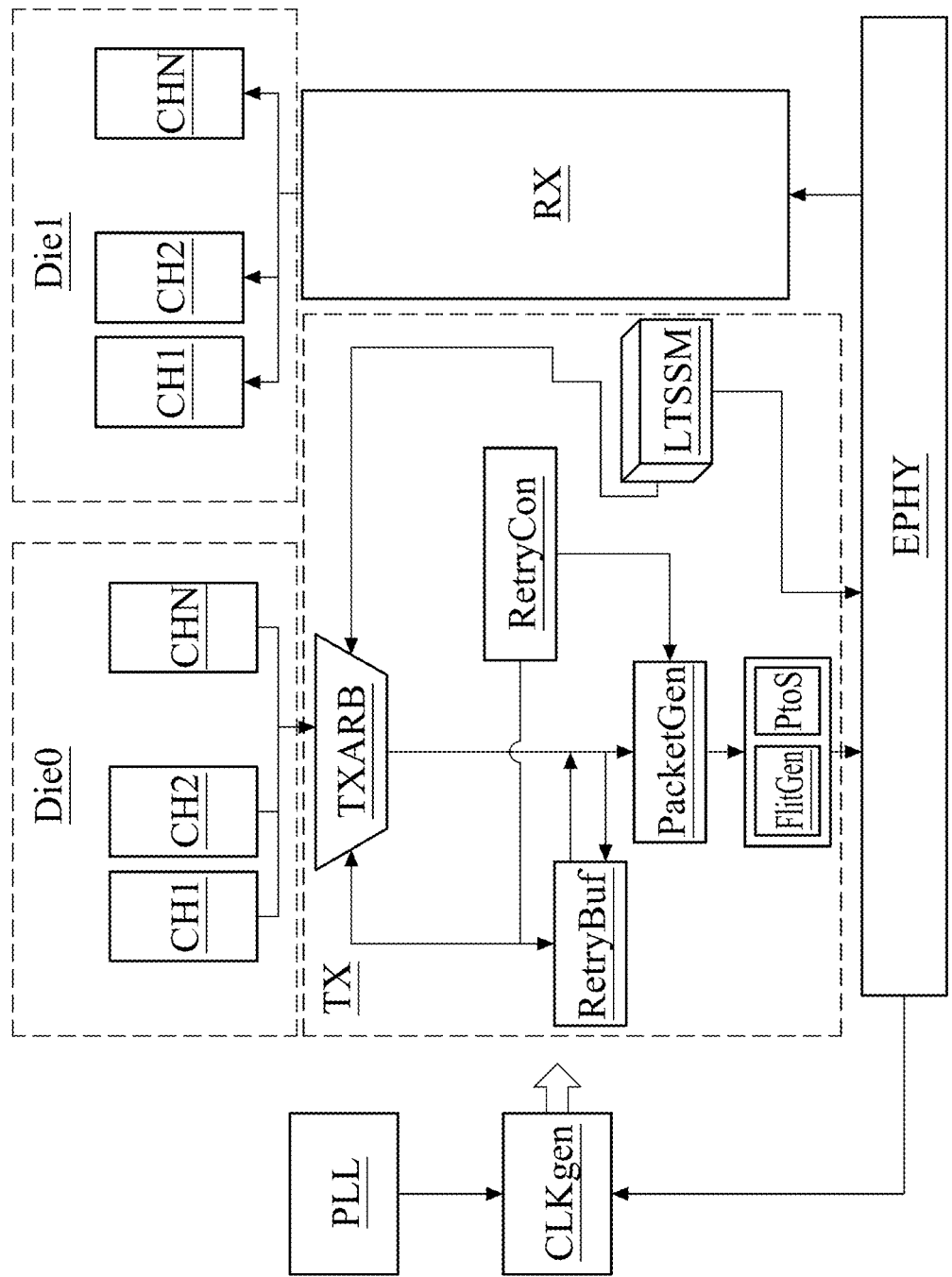
FIGS. 12A and 12B depict the data path and hardware structure of a die-to-die interconnect interface ZDI between two dies Die0 and Die1 in accordance with an exemplary embodiment of the present invention.
Figure 12B:
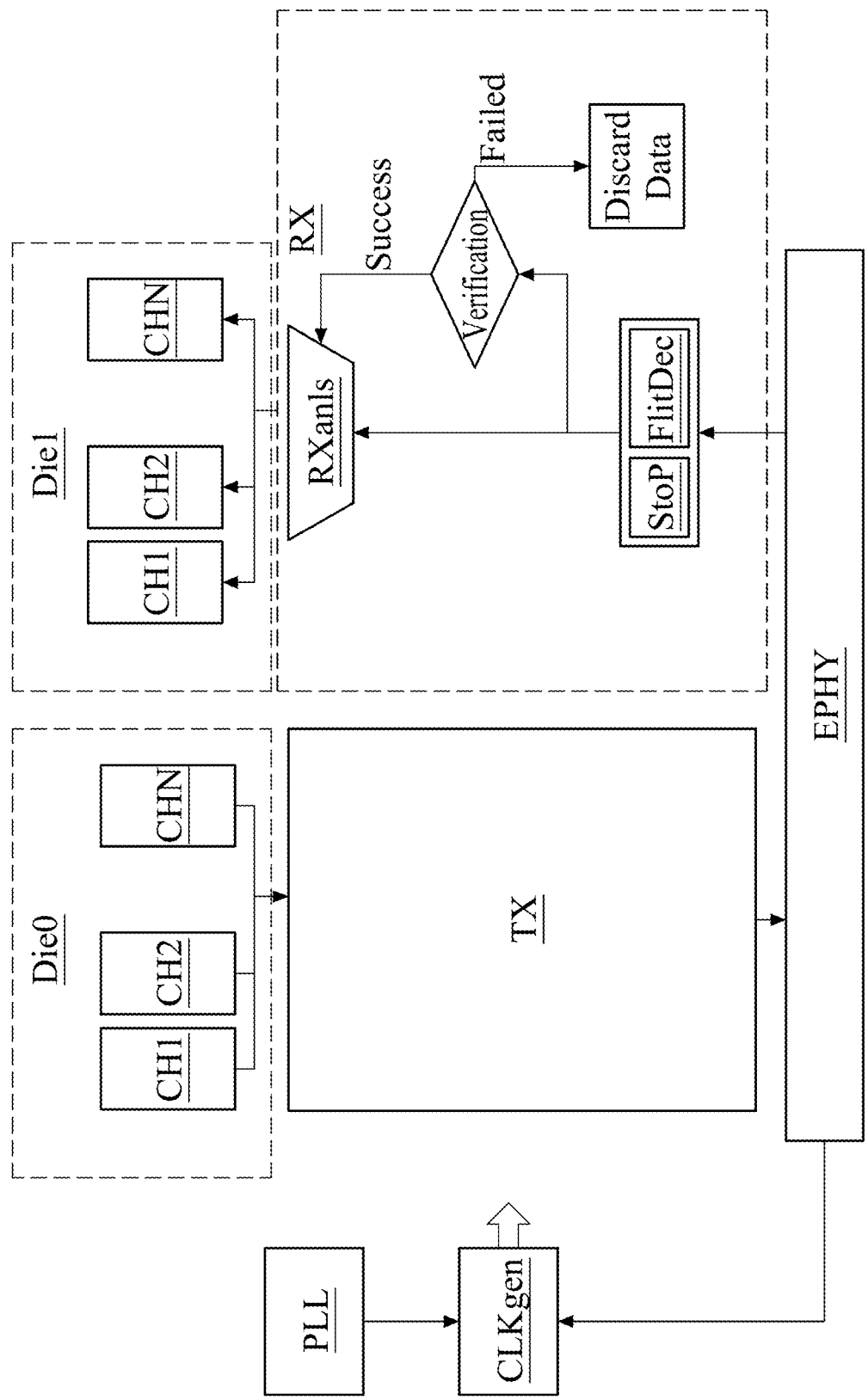

FIGS. 12A and 12B depict the data path and hardware structure of a die-to-die interconnect interface ZDI between two dies Die0 and Die1 in accordance with an exemplary embodiment of the present invention. In particular, unlike the packet format 1000 of the socket-to-socket interconnect interface ZPI that is of a non-fixed length ($2^N$ bits), the die-to-die interconnect interface ZDI uses a packet format that of a fixed length. Compared with the details of the transmitter TX of the socket-to-socket interconnect interface ZPI in FIG. 11A, the transmitter TX of the die-to-die interconnect interface ZDI of FIG. 12A does not require the data compressor DataComp. Compared with the details of the receiver RX of the socket-to-socket interconnect interface ZPI in FIG. 11B, the receiver RX of the die-to-die interconnect interface ZDI of FIG. 12B does not require the data rearrangement module DataRea. Furthermore, the same as those shown in FIGS. 11A and 11B, the die-to-die interconnect interface ZDI can have a verification and retransmission design and a state machine for speed reduction.

In summary, an interconnect interface (ZPI/ZDI) implemented in accordance with an exemplary embodiment of the present invention includes a first transmitter (TX0), a first receiver (RX0), and an electrical physical layer (EPHY) between the first transmitter (TX0) and the first receiver (RX0). The data provided by a first device (socket0/Die0) is transferred from the first transmitter (TX0) to the receiver (RX0) through the electrical physical layer (EPHY), and a second device (socket1/Die1) finally obtains the transferred data from the receiver (RX0). The first transmitter (TX0) includes an arbiter (TXARB) that arbitrates between the data from the different channels (CH1~CHN) of the first device (socket0/Die0). The first transmitter (TX0) includes a packet generator (PacketGen). The packet generator (PacketGen) packs the data winning the arbitration as packets (e.g. flits) to be transferred through the electrical physical layer (EPHY). The first transmitter (TX0) further includes a first buffer (RetryBuf), to back up the data obtained from the first device (socket0/Die0) for retransmission.

In an exemplary embodiment, the first transmitter (TX0) further includes a dummy packet generator (FlitGen). When the packet generator (PacketGen) is idle (not generating any packets), the dummy packet generator (FlitGen) generates packets with dummy contents to be transferred through the electrical physical layer (EPHY). The first transmitter (TX0) further includes a parallel-to-serial converter (PtoS). Before being transferred through the electrical physical layer (EPHY), the packets in a parallel form are transformed into a serial form by the parallel-to-serial converter (PtoS). The first receiver (RX0) includes a serial-to-parallel converter (StoP), which performs serial-to-parallel conversion on the packets received from the electrical physical layer (EPHY). The first receiver (RX0) further includes a decoder (FlitDec) that decodes the received packets. The first receiver (RX0) further includes a verification logic module. When verification fails, the received data is discarded, and the second device (socket1/Die1) will request the first device (socket0/Die0) to retransmit the failed data. The first receiver (RX0) further includes an analysis module (RXanls), which analyzes the data that has passed verification, and distributes them to a proper channel from among the channels (CH1~CHN) of the second device (socket1/Die1).

In an exemplary embodiment, the interconnect interface ZPI/ZDI further includes a second transmitter (TX1) and a second receiver (RX1) coupled at the two ends of the electrical physical layer (EPHY). The second transmitter (TX1) is coupled to the second device (socket1/Die1), and the second receiver (RX1) is coupled to the first device (socket0/Die0). The interconnect interface ZPI/ZDI is a full-duplex structure.

In the present invention, the interconnection interface includes ZPI/ZDI functions such as retransmission, speed reduction, and so on, and is implemented by pipelined hardware. The special format for the transmitted packets is presented in the present invention. The interconnect interface ZPI/ZDI and the devices communicate by a handshaking technology.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An interconnect interface, comprising:
a first transmitter and a first receiver; and
an electrical physical layer, coupled between the first transmitter and the first receiver;
wherein:
the first transmitter is coupled to a first device, and the first receiver is coupled to a second device;
data provided by the first device is transmitted by the first transmitter, transferred through the electrical physical layer, received by the first receiver;
the first transmitter includes an arbiter for arbitrating between a plurality of channels of the first device to obtain the data from the first device;
the first transmitter includes a packet generator, which packs the data obtained from the first device into packets to be transferred through the electrical physical layer;
the first transmitter further includes a first buffer that backs up the data obtained from the first device for retransmission;
the interconnect interface is a socket-to-socket interconnect interface or a die-to-die interconnect interface; and
the interconnect interface further comprises a second transmitter and a second receiver coupled at two ends of the electrical physical layer; and
the second transmitter is coupled to the second device and the second receiver is coupled to the first device, and the interconnect interface forms a full-duplex structure.

2. The interconnect interface as claimed in claim 1, wherein:
the first transmitter further includes a dummy packet generator, which generates packets carrying dummy contents to be transferred through the electrical physical layer when the packet generator is idle without generating any packets.

3. The interconnect interface as claimed in claim 2, wherein:
the first transmitter further includes a parallel-to-serial converter, by which the packets are converted from a parallel form into a serial form to be transferred through the electrical physical layer; and
the first receiver includes a serial-to-parallel converter, which performs serial-to-parallel conversion on the packets received from the electrical physical layer.

4. The interconnect interface as claimed in claim 3, wherein:
the first receiver further includes a decoder, which decodes the received packets and outputs decoded data, wherein the decoded data comprise the data obtained from the first device.

5. The interconnect interface as claimed in claim 4, wherein:
the first receiver further includes a verification logic module, for verification of the decoded data; and
when the verification fails, the verification logic module discards the decoded data, and informs the second device to issue a retransmission request to the first device.

6. The interconnect interface as claimed in claim 5, wherein:
the first receiver further includes an analysis module, which analyzes the decoded data that has passed verification and distributes them, according to analysis, to a plurality of channels of the second device.

7. The interconnect interface as claimed in claim 1, further comprising:
the first transmitter that further includes a retransmission controller;
when the verification logic module of the first receiver fails to verify the decoded data, the second device issues the retransmission request to be transferred to the first device through the second transmitter, the electrical physical layer, and the second receiver; and
according to the retransmission request, the first device operates the retransmission controller in the first transmitter to obtain backup data from the first buffer for retransmission.

8. The interconnect interface as claimed in claim 1, wherein:
the first transmitter further includes a state machine, which stops the arbiter and reduces a transmission rate of the electrical physical layer when being switched to a low-speed state.

9. The interconnect interface as claimed in claim 8, wherein:
the first transmitter further includes a second buffer;
when the state machine is in the low-speed state, the packets that the electrical physical layer has not yet transferred are buffered in the second buffer.

10. The interconnect interface as claimed in claim 9, wherein:
the first receiver further includes a third buffer, buffering data received from the electrical physical layer to wait for verification and analysis;
when the third buffer is full, the second device issues a slow-down request to be transferred to the first device through the second transmitter, the electrical physical layer, and the second receiver; and
according to the slow-down request, the first device switches the state machine to the low-speed state.

11. The interconnect interface as claimed in claim 9, wherein:

the state machine is switched to the low-speed state by the first device in response to a low power consumption setting.

12. The interconnect interface as claimed in claim 9, wherein:
  each said packet transmitted between the first device and the second device through the interconnect interface is in a format that includes a unit code, packet contents, cyclic redundancy checking code, and forward error correction code;
  data provided by the first device or the second device for transmission is packed as packet contents;
  the unit code shows attribution of the packet contents; and
  the cyclic redundancy checking code and the forward error correction code allow a receiver to verify the packet contents.

13. The interconnect interface as claimed in claim 12, wherein:
  the unit code indicates whether the packet contents are dummy contents or data obtained from a device;
  the unit code further indicates whether the packet contents carry the retransmission request; and
  the unit code further indicates whether the packet contents show a status of a buffer of a receiver for determining whether to switch the interconnect interface to the low-speed state.

14. The interconnect interface as claimed in claim 13, wherein:
  the unit code further indicates whether the packet contents carry a power management request;
  the unit code further indicates whether the packet contents are valid; and
  the unit code further indicates whether the packet contents carry a start flag, an ending flag, or an idle flag.

15. The interconnect interface as claimed in claim 6, wherein:
  the first transmitter and the first receiver are pipelined hardware.

16. The interconnect interface as claimed in claim 6, wherein:
  the first device and the second device are a first socket and a second socket, respectively; and
  each packet transmitted between the first socket and the second socket through the interconnect interface is in a non-fixed length, 2N bits, and N is a natural number.

17. The interconnect interface as claimed in claim 16, wherein:
  the first transmitter further includes a data compressor coupled between the arbiter and the packet generator, to compress data to form the packet contents of each packet of non-fixed length; and
  to process each packet of non-fixed length, the first receiver further includes a data rearrangement module, which rearranges data passing verification and supplies rearranged data to the analysis module.

18. The interconnect interface as claimed in claim 6, wherein:
  the first device and the second device are a first die and a second die, respectively; and
  each packet transmitted between the first die and the second die through the interconnect interface is in a fixed length.

19. The interconnect interface as claimed in claim 1, wherein:
  by handshaking between the first device and the first transmitter, the first transmitter obtains data from the first device, and transmits the obtained data to the first receiver through the electrical physical layer; and
  by handshaking between the first receiver and the second device, data that the first receiver receives from the electrical physical layer is transferred to the second device.

* * * * *